United States Patent [19]

Minerbo et al.

[11] Patent Number: 5,041,975

[45] Date of Patent: Aug. 20, 1991

[54] BOREHOLE CORRECTION SYSTEM FOR AN ARRAY INDUCTION WELL-LOGGING APPARATUS

[75] Inventors: Gerald N. Minerbo, Missouri City, Tex.; John W. Miles, Ithaca, N.Y.

[73] Assignee: Schlulmberger Technology Corporation, Houston, Tex.

[21] Appl. No.: 638,141

[22] Filed: Jan. 8, 1991

Related U.S. Application Data

[63] Continuation of Ser. No. 240,997, Sep. 6, 1988, abandoned.

[51] Int. Cl.$^5$ .......................... G01V 3/38; G01V 3/28
[52] U.S. Cl. .................................... 364/422
[58] Field of Search ................ 364/422; 324/338, 339; 73/151, 152

[56] References Cited

U.S. PATENT DOCUMENTS

| | | | |
|---|---|---|---|
| 3,179,879 | 4/1965 | Tanguy | 324/339 |
| 4,158,165 | 6/1979 | Coates | 324/338 |
| 4,338,664 | 7/1982 | Mayer | 364/422 |
| 4,553,097 | 11/1985 | Clark | 324/338 |
| 4,677,386 | 6/1987 | Chapman | 364/422 |
| 4,714,889 | 12/1987 | Chapman | 364/422 |
| 4,796,186 | 6/1989 | Kaufman | 364/422 |

FOREIGN PATENT DOCUMENTS 0855586 8/1981 U.S.S.R. ............................. 324/339

OTHER PUBLICATIONS

"Phasor* Induction Tool" published by Schlumberger, copyright 1986.
"Log Interpretation Charts" published by Schlumberger Limited English—Metric 1979 Edition, copyright 1979.

Primary Examiner—Clark A. Jablon
Attorney, Agent, or Firm—Henry N. Garrana; John H. Bouchard

[57] ABSTRACT

A new borehole correction software, for use in a well logging truck computer, obtains an accurate measurement of the true conductivity of a formation in a borehole by subtracting a correction term, which is a function of the mud conductivity, the borehole radius, the standoff distance, and an estimated value of the formation conductivity, from certain raw data received by a receiver thereby producing a set of eighteen complex output voltages which represent signals that would have been recorded from the receiver had there been no borehole.

14 Claims, 8 Drawing Sheets

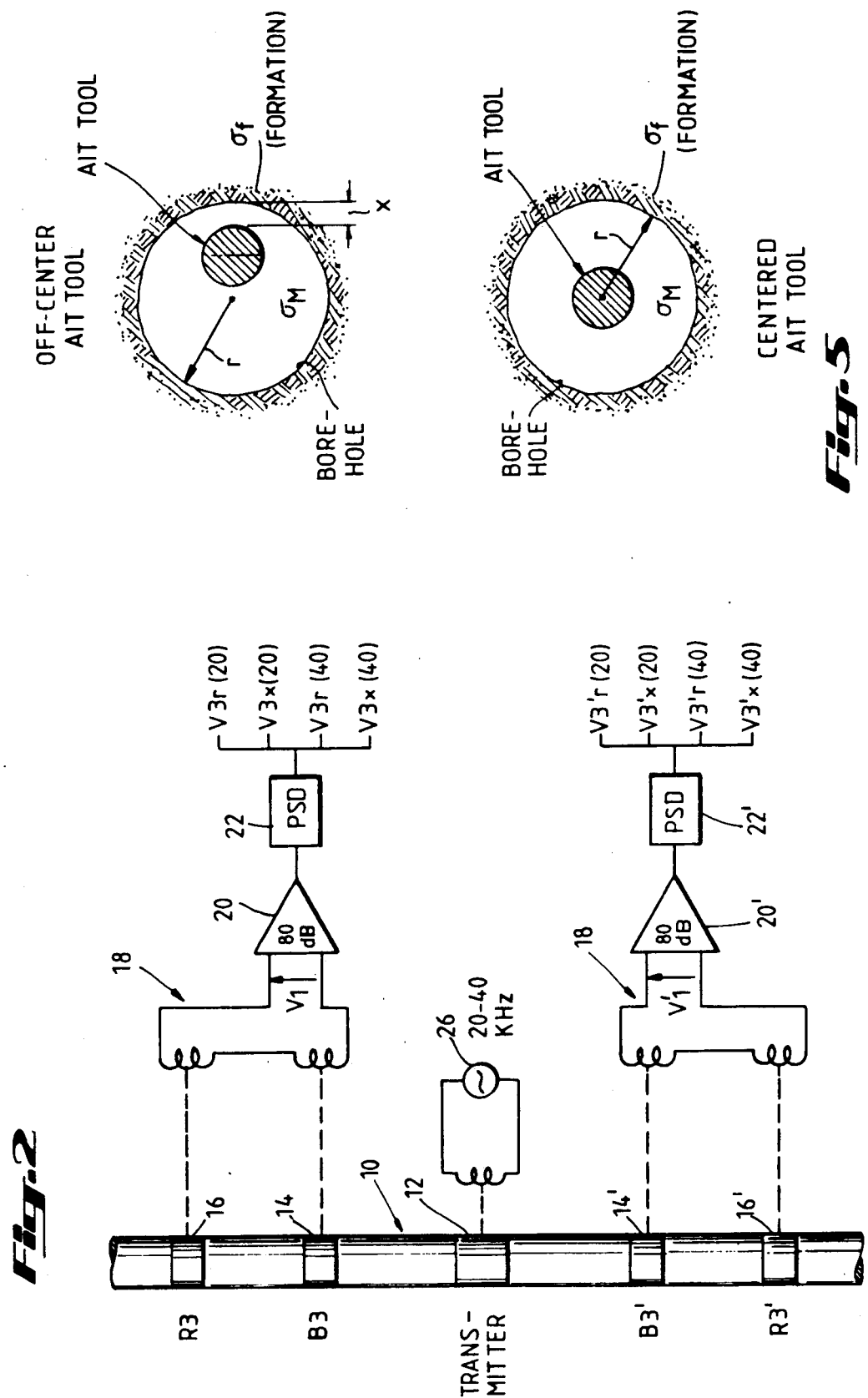

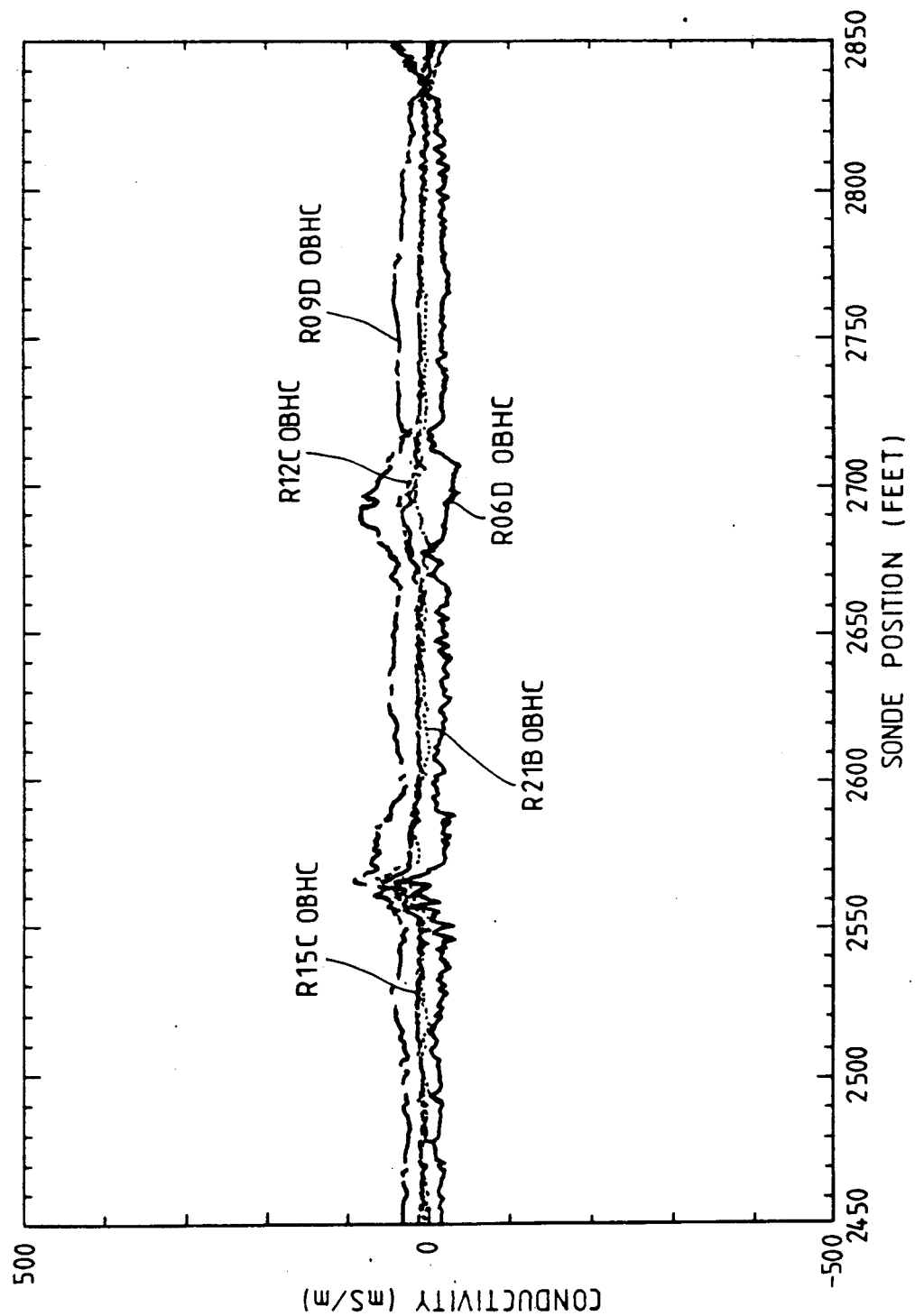

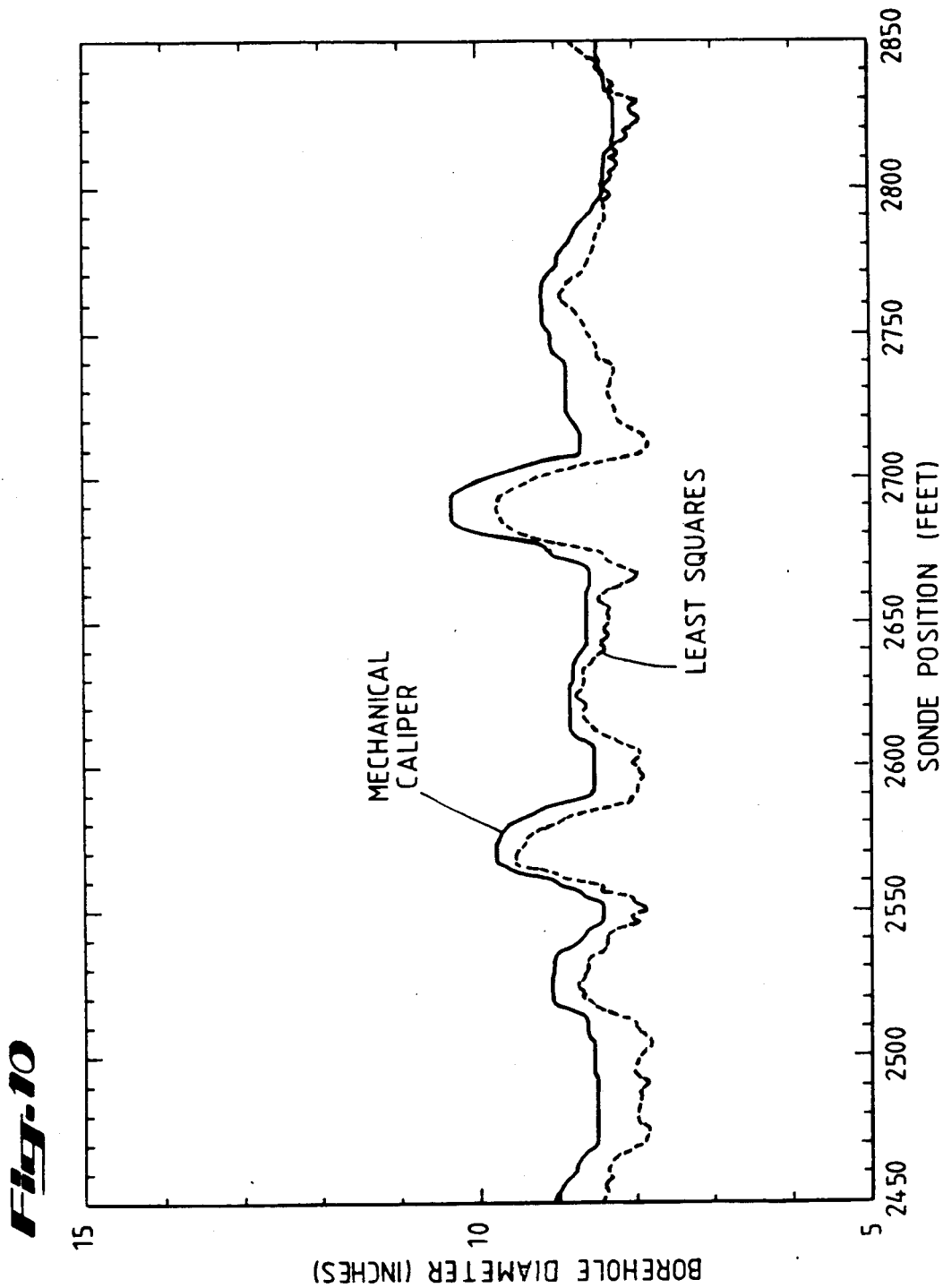

BOREHOLE CORRECTION SYSTEM FOR AN ARRAY INDUCTION WELL-LOGGING APPARATUS

This is a continuation of application Ser. No. 07/240,997 filed 9/6/88, abandoned.

BACKGROUND OF THE INVENTION

The invention of the subject application pertains to an array induction logging apparatus for oil well boreholes and more particularly, to a borehole correction system associated with the induction logging apparatus for correcting for the effects of the borehole on an overall formation conductivity measurement.

An induction logging apparatus, disposed in a wellbore, or borehole of an oil well, basically comprises at least one transmitting coil and at least one receiving coil mounted on a support and axially spaced from each other in the direction of the borehole. The transmitting coil is energized by an alternating current at a frequency which is typically 20 kHz and generates an electric field which induces in the formation, surrounding the borehole, eddy currents which flow coaxially to the borehole and the intensity of which is proportional to the conductivity of the formation. The field generated in turn by these eddy currents induces in the receiving coil an electromotive force (EMF), which produces a received signal in the receiving coil. By suitably processing the received signal from the receiving coil, a measurement of the conductivity of the formation is obtained.

However the conductivity of the mud or drilling fluid in the borehole may distort the measured value of the conductivity of the formation. One prior art induction logging apparatus, known as the 6FF40 sonde, consists of three transmitter coils and three receiver coils. In the 6FF40 sonde, the effective coil spacing is about 40 inches; the coil positions and the number of turns on the coils is designed to minimize the effect of the borehole. Therefore, although the conductivity of the mud (sigma$_m$ or s$_m$) did distort the determination of the true formation conductivity (Sigma$_t$ or s$_t$) the distortion was small and required a relatively minor correction. As a result, with the aforementioned prior art well logging apparatus, the borehole corrections could be applied after recording and signal processing the data, and frequently were left up to the formation analyst interpreting the induction logs. However, a new well logging array induction tool was developed, the characteristics of which were disclosed in prior pending application Ser. No. 043,130, filed Apr. 27, 1987 entitled "Induction Logging Method and Apparatus", and in prior pending application Ser. No. 932,231, filed Nov. 18, 1986 entitled "Induction Logging Sonde With Metallic Support", now U.S. Pat. No. 4,873,488. These applications, Ser. Nos. 043,130 and 932,231, are incorporated by reference into the specification of this application. This new well logging array induction tool (hereinafter termed the "AIT Tool") has one transmitter coil and nine (9) receivers with two coils per receiver. The spacing between transmitter and receiver coil pairs ranges from 6 inches to 72 inches. The signals from the nine receivers collect information about the conductivity at different depths in the formation. Because there are so many more measurements in the new AIT tool, relative to the prior art induction logging apparatus, manual correction of the signal for the effect of the borehole and would be cumbersome and time-consuming. Also in the AIT the receivers with a small spacing are more strongly affected by the conductive borehole fluid, and the correction is not a small fraction of the recorded signal. As a result, using the new AIT tool, in order to obtain an accurate measurement of the true conductivity of the formation s$_t$, the measured EMF for each receiver must be corrected for the effect of the borehole in software, prior to signal processing. The portion of the induced EMF associated with the conductivity of the mud, s$_m$, must be removed from the induced EMF in each of the nine receivers thereby yielding an EMF which represents the actual conductivity of the formation. The induced EMF signals form the AIT, after applying borehole corrections, and after signal processing, give an indication of the conductivity in the formation at different radial distances from the borehole. When the AIT induction logs are combined with other information such as the porosity of the rock, and the ground water conductivity, they can be used to infer the water saturation which indicates the presence of hydrocarbons. Because the AIT probes different radial distances into the formation, it will also indicate invasion of the formation rock by fluids from the borehole.

A prior art technique for correcting an induction log for the effect of the borehole is set forth in a publication entitled "Phasor Induction Tool", published by the assignee of this application, dated July 1986. A similar prior art technique is set forth in another publication entitled "Schlumberger Log Interpretation Chart", the 1979 edition. In both the aforementioned publications, the described prior art technique for performing the borehole correction involves manually performing the subtraction by referring to set of curves (borehole geometrical factor versus hole diameter), calculating the contribution to the induced EMF associated with the conductivity of the mud, and performing the aforementioned subtraction.

This prior art manual technique would be very cumbersome for an array induction sonde having many receiving coils, such as the new AIT tool. Furthermore it would not be sufficiently accurate for the signals coming from the short-spacing receivers.

SUMMARY OF THE INVENTION

Accordingly, it is a primary object of the present invention to obtain an accurate measurement of the true conductivity of a formation, s$_t$, at different depths and at different radial distances surrounding a borehole of an oil well with an induction sonde consisting of an array of receiver coils.

It is another object of the present invention to obtain an accurate measurement of the true conductivity of a formation, s$_t$, by applying new borehole correction software for use with a well-site computer, the software automatically correcting the measured value of the induced EMF in each receiver by removing therefrom the contribution associated with the conductivity of the mud in the borehole thereby yielding voltage values which represent the true conductivity of the formation s$_t$.

These and other objects of the present invention are accomplished by developing borehole correction software which functions in association with a well-site computer connected to the new AIT array induction logging tool. The transmitter coil in the AIT carries alternating currents of four different frequencies which generate electric fields in the formation surrounding the borehole, which electric fields induce eddy currents proportional to the conductivity in the formation. Electromotive forces are induced in nine different receiver coil pairs. In each receiver, the open-circuit voltage at two different frequencies is detected, amplified, and converted to digital form. The open-circuit voltage is represented as a complex number, the real part of which is the component of the voltage in phase with the transmitter current, and the imaginary part of which is the quadrature (90-degree out-of-phase) component of the open-circuit voltage Because two frequencies are detected in each receiver, the data recorded for each vertical depth of the AIT consists of eighteen (18) complex voltages, denoted $V_{meas}$. These eighteen signals (otherwise termed "AIT Raw Data") are processed in the wellsite computer by the borehole correction software of the present invention using, in addition to the AIT raw data, certain other borehole or wellbore parameters, such as the conductivity of the mud sm, the radius of the borehole or wellbore r, and the tool stand of distance x, that is, the distance between the AIT tool external surface and the borehole wall (in the off-center case) An AIT log can be operated with the tool centered in the borehole by means of centralizers, or off-center by using rubber fins to maintain a constant standoff distance. The AIT borehole correction software has provisions for both model of operation. The borehole correction software processes the AIT raw data b removing therefrom a correction term which is a function of the mud conductivity $s_m$, the borehole radius r, the standoff distance x, and an estimated value of -the formation conductivity $s_f$. The output of the borehole correction software is a set of eighteen complex voltages, denoted $V_{corr}$ which represent the signals that would have been recorded in the absence of a borehole.

The borehole correction software processes the input data stream of AIT raw signals $V_{meas}$ and produces an output data stream $V_{corr}$ by using a relation of the form $$V_{corr} = V_{meas} - V_{model}(s_m, s_f, r, x).$$

Here $V_{model}$ is derived from model calculations, and depends on four parameters: the mud conductivity $s_m$, an estimated formation conductivity $s_f$, the borehole radius r, and the standoff distance x. Several options are available for selecting the model parameters. The mud conductivity $s_m$ is obtained from a mud resistivity logging apparatus if available or, if not available, from a sample of the borehole fluid. The formation conductivity estimate $s_f$ can be obtained from a shallow resistivity log such as a micro-SFL (micro spherically focused log) if available, or, if not available by performing a least square minimization using the $V_{meas}$ data for the short-spacing arrays. The borehole radius r can be obtained from a borehole caliper tool if available, or, if not available, can be estimated from the $V_{meas}$ data by performing a least squares minimization. For the mud standoff distance x, one can use the nominal standoff distance determined by the standoff fins mounted on the body of the AIT tool, or, for an irregular borehole, an effective standoff distance can be estimated from the $V_{meas}$ preforming a least squares minimization. The Levenberg-Marquard method is used to determine optimum values for the parameters that are being estimated by the least squares criterion.

Further scope of applicability of the present invention will become apparent from the detailed description presented hereinafter. It should be understood, however, that the detailed description and the specific examples, while representing a preferred embodiment of the invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to by limitative of the present invention, and wherein:

FIG. 2 illustrates a more detailed construction of the AIT tool of FIG. 1;

FIG. 5 illustrates the borehole parameters used by the borehole correction software;

FIG. 9 illustrates the AIT raw data signals after an optimized borehole correction; and FIG. 10 illustrates a set of curves representing borehole diameter versus sonde position.

DESCRIPTION OF THE PREFERRED EMBODIMENT

Figure 1:
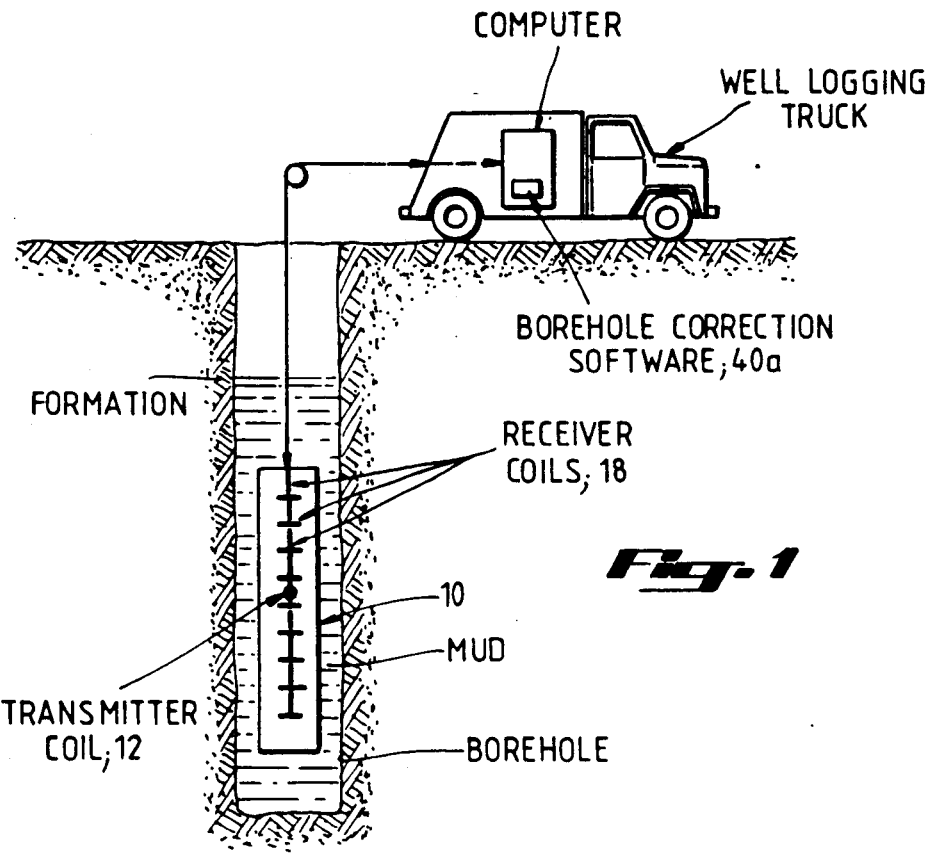
FIG. 1 illustrates a wellbore in which the new array induction tool (AIT) is disposed, the AIT tool being connected to a computer in a logging truck wherein the borehole correction software the present invention is stored.

Referring to FIG. 1, a borehole of an oil well is illustrated. An array induction tool (AIT) 10 is disposed in the borehole, the AIT tool 10 being connected by a wireline cable to a well-logging truck at the surface of the well. The well-logging truck contains a computer in which the borehole correction software of the present invention is stored. The well-logging truck computer may comprise any typical computer, such as the computer set forth in U.S. Pat. No. 4,713,751 entitled "Masking Commands for a Second Processor When a First Processor Requires a Flushing Operation in a Multiprocessor System", the disclosure of which is incorporated by reference into the specification of this application. The AIT tool comprises one transmitter coil 12 and nine (9) receivers 18 each consisting of two coils. The transmitter coil is energized by a known reference current consisting of four frequencies, approximately 25, 50, 100, and 200 kHz (kiloHerz). The transmitter coil generates an electric field in the formation, which produces a coaxial eddy current proportional to the formation conductivity which then induces an electromotive force in each of the 9 receivers. Each receiver 18 comprises a main coil and a bucking coil connected in series.

Referring to FIG. 2, a more detailed construction of the AIT tool 10, of FIG. 1, is illustrated. The receiver coils respond with a voltage signal V1 which depends on formation characteristics. The voltage signal V1 is amplified, filtered into four separate frequencies, and resolved into in-phase and quadrature components, by the circuitry 20, 22. The voltage is represented in complex (phasor) notation with the in-phase component as the real part of the complex number, and the quadrature (90-degree out-of-phase) component as the imaginary part of the complex number. Two frequencies are selected for each of the nine arrays. Thus for each depth of the AIT tool in the well, eighteen (18) complex voltages are recorded. This data set will be referred to as "AIT raw data". The AIT raw data are transmitted by telemetry to the logging truck computer at the surface for processing.

The AIT tool 10 of FIG. 2 is set forth in detail in prior pending application Ser. No. 043,130, filed Apr. 27, 1987, the disclosure of which is incorporated by reference into the specification of this application.

In FIG. 2, simple individual arrays are preferred generally consisting of a single transmitter coil 12 and two receiver coils 16, 14 (16', 14'). The basic three-coil induction sensor includes a primary receiver coil 16 located at a distance L from the transmitter. A secondary or bucking coil 14 acts as a mutual inductance balancing coil. The secondary coil is connected in series with the primary coil, but is wound in a opposite sense to the primary coil. The placement of the secondary coil between the transmitter coil 12 and the primary receiver coil 16 is a matter of choice, but once its placement is fixed, the number of its windings may be selected so as substantially to balance or null the direct mutual coupling between the transmitter and the receiver array. If the position of the bucking coil is selected to be 3L/4 or three-fourths of the distance between the transmitter coil 12 and the primary receiver coil 16, the number of turns in the bucking coil should be approximately $(0.75)^3 = 0.422$ times the number of turns in the primary coil in order to achieve the balanced condition.

Preferably the AIT tool 10 is constructed of a number of these simple arrays by placing a single transmitter 12 at the center of the tool and placing pairs of receiver coils such as pairs 16, 14 and 16', 14' on either side of it. Amplifiers 20, 20' and phase-sensitive detectors 22, 22' (PSD) may be constructed of conventional analog induction electronics. As illustrated, a multi-frequency oscillator 26, operating at four frequencies 25, 50, 100 and 200 kHz, excite transmitter 12. The receiver arrays, spaced, for example, three feet from transmitter 12, respond with voltage signals, $V_1$, $V_1'$ which depend on formation characteristics. Such voltage signals are amplified, filtered into frequency components at 25 and 50 kHz, and resolved into in-phase and quadrature (90-degree out-of-phase) components.

Figure 3:
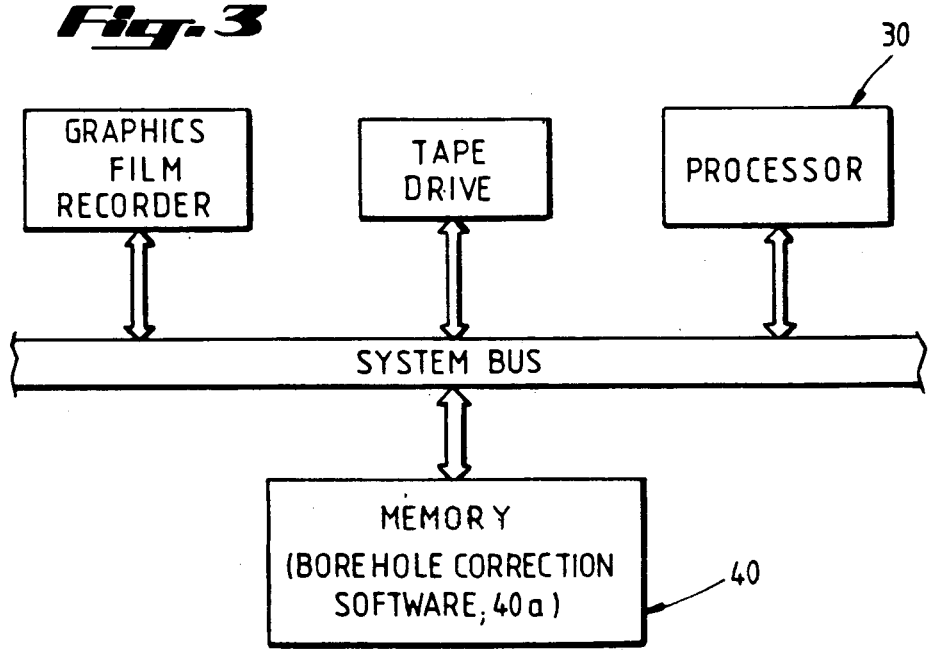
FIG. 3 illustrates a more detailed construction of the well-site computer having a memory wherein the borehole correction software of the present invention is stored, a central processor to perform the required arithmetic operations, and storage media to save the processed data.

In FIG. 3, the simple construction of the well-logging truck computer is illustrated. The computer comprises a processor 30, a tape drive, and main memory 40. The main memory 40 stores a set of software termed the "borehole correction software" 40a of the present invention. The computer of FIG. 3 may be any typical computer, such as the multiprocessor computer described in U.S. Pat. No. 4,713,751, referenced hereinabove, the disclosure of which is incorporated by reference into the specification of this application.

Figure 4:
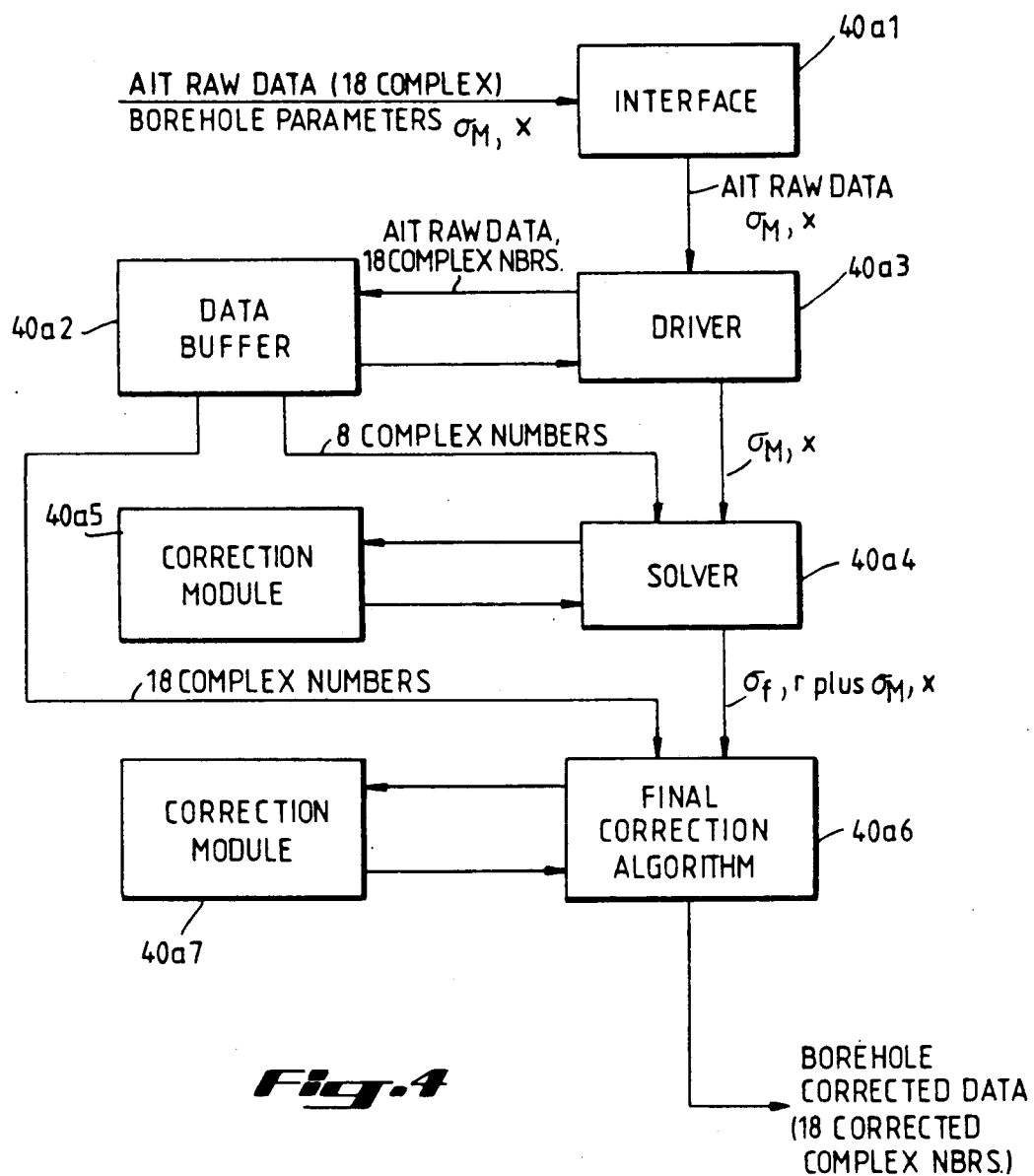
FIG. 4 illustrates a more detailed construction of the borehole correction software of the present invention.

In FIG. 4, a flow diagram of the borehole correction software, stored in the main memory 40 of FIG. 3, is illustrated.

In FIG. 4, the borehole correction software 40a comprises an interface 40a1 which receives the 18 complex voltages which comprise the AIT Raw Data and a set of borehole parameters. Recall that the AIT Raw Data includes the eighteen (18) complex numbers output from the AIT tool 10 disposed in the wellbore. The borehole parameters include the conductivity of mud ($s_m$), the radius of the borehole (r), and the tool standoff distance (x), that is, the distance between the AIT tool 10 exterior surface and the borehole wall (in case the tool is operated off-center). The borehole parameters are shown more clearly in FIG. 5 of the drawings. The borehole correction software 40a further comprises a data buffer 40a2, connected to the interface via a driver 40a3, the data buffer 40a2 receiving the eighteen (18) complex numbers from the interface 40a1; a solver 40a4 which receives from the driver 40a3 given or fixed values of the conductivity of mud ($s_m$) and the standoff distance (x), and determines, by least squares optimization, appropriate values for the other two parameters, the formation conductivity ($s_f$), and the borehole radius (r); a correction module 40a5 which receives four borehole parameters $s_f$, sm, r, and x, and computes model values for eight (8) of the eighteen (18) complex voltages that are a function of the four borehole parameters, the solver 40a4 receiving the eight model voltages from the correction module 40a5 and the corresponding eight Raw Data measured voltages from the data buffer 40a2, and performing a least squares minimization to determine values of $s_f$ and r that most nearly match the eight measured complex voltages from the data buffer 40a2, the above minimization being performed iteratively until a final set of borehole parameters are determined; and a final correction module 40a6 which receives the final set of borehole parameters from the solver 40a4, and, after one call to the correction module 40a7 to compute model values for all eighteen (18) complex voltages, generates a set of borehole corrected data, the borehole corrected data representing an approximation to the voltages that the AIT would have recorded in the absence of the borehole.

Figure 6:
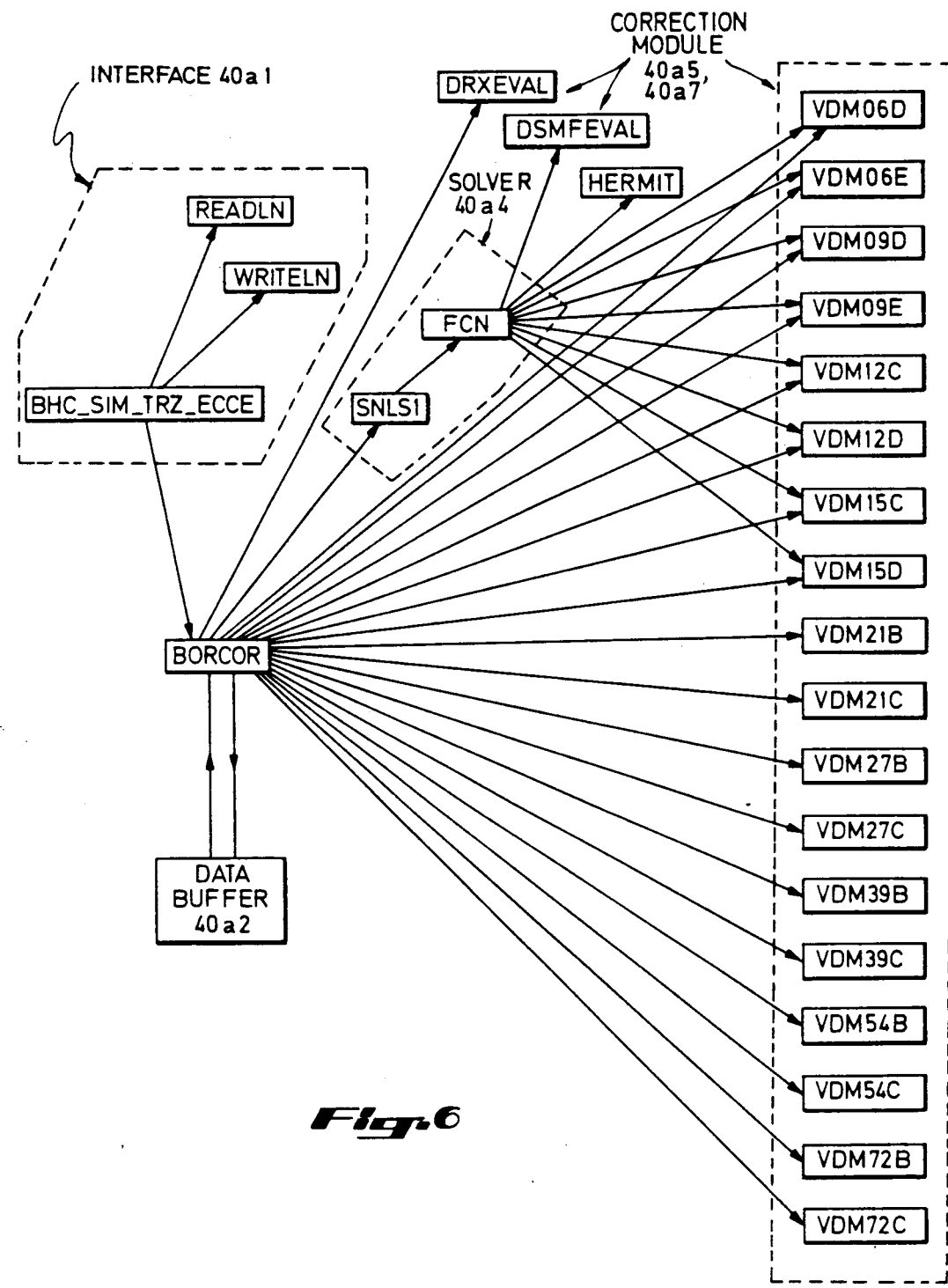
FIG. 6 illustrates the various subroutines which comprise the borehole correction software of the present invention.

Referring to FIG. 6, the borehole correction software 40a call structure is illustrated in FIG. 6, the subroutines 40a which comprise the interface 40a1, the solver 40a4, the driver 40a3, and the correction modules 40a5 and 40a7 are illustrated. Furthermore, the call structure sequence is illustrated. For example, the driver 40a3 (BORCOR) calls each of the subroutines within the correction modules 40a5, 40a7, with the exception of subroutine DSMFEVAL, which subroutine is called by subroutine FCN in the solver 40a4.

A detailed description of the borehole correction software 40a of FIGS. 3, 4, and 6 is set forth in APPENDIX A provided hereinbelow.

A functional description of the borehole correction software of the present invention will be set forth in the following paragraphs with reference to FIGS. 1-5 of the drawings, and, in particular, FIG. 4. This functional description will concentrate on one operating option of the borehole correction software, namely the case where the mud conductivity ($s_m$) and the standoff (x) are known to the operating engineer, but the borehole radius (r) and an effective formation conductivity ($s_f$) are not known, for example because a mechanical caliper is not available and/or a shallow resistivity log is not available. Options are available to allow the borehole correction software to select optimum values of other combinations of the model borehole parameters, for example the effective formation conductivity ($s_f$) and the standoff (x).

The AIT raw data from receiver coils 18 is received by the interface 40a1, the interface 40a1 transmitting the AIT raw data to the data buffer 40a2 via driver 40a3 for temporary storage therein. Recall that the AIT raw data includes eighteen (18) complex voltages (two frequencies for each of the nine receiver coils) associated with each position occupied by the AIT tool 10 in the wellbore. For the operating option under consideration, the interface 40a1 also receives two borehole parameters which consist of the mud conductivity ($s_m$) and the standoff distance (x), in the off-center case. The other two borehole parameters, the conductivity of the formation ($s_f$) and the radius of the borehole r, are yet to be determined. The borehole parameters $s_m$, and x are passed directly from interface 40a1 to the solver 40a4.

The AIT raw data (eighteen complex voltages) $V_{meas}$ are transmitted to the driver module 40a3 and stored in the data buffer 40a2. The data buffer stores forty (40) depth samples for each of the 18 channels, so that borehole irregularities can be correlated in depth. The driver program then selects eight of the eighteen complex voltages $V_{meas}$ from appropriate depths and transmits these eight complex voltages to the solver 40a5. The eight complex voltages selected are those associated with the four receivers which are nearest the transmitter coil 12. The solver 40a4 also receives two borehole parameters $s_m$, x from the driver 40a3, and selects an initial set of values for the remaining two borehole parameters $s_f$, r. This first selected set of borehole parameters is passed to the correction module 40a5.

In response thereto, the correction module 40a5 computes model values $V_{model}$ for the eight complex voltages that are a function of the initial set of borehole parameters $s_m$, $s_f$, r, x. The model values are computed from approximate formulas obtained by fitting tabulated values of the borehole signal; the tabulated values having been obtained by solving Maxwell's equations on a large mainframe computer. Listed below is the form of the in-phase component of the voltage for one channel (the real part of $V_{model}$):

$$R_{model}(s_m, s_f, r, x) = (s_m - s_f)[c_0(s_f, r, x) + c_1(s_f, r, x)w +$$
$$c_2(s_f, r, x)w^2 + c_3(s_f, r, x)w^3 + c_4(s_f, r, x)w^4 + c_5(s_f, r, x)s_m +$$
$$c_6(s_f, r, x)s_m^2 + c_7(s_f, r, x)s_m^3 + c_8(s_f, r, x)s_f + c_9(s_f, r, x)\log(s_f)],$$

where w is the following ratio:

$$w = (s_m - s_f)/(s_m + s_f).$$

The functions $c_1, \ldots, c_8$ have the following form:

$$c_i(s_f, r, x) = b_{i0}(r, x) + b_{i1}(r, x) + b_{i2}(r, x)\mathrm{sqrt}(s_f)$$
$$+ b_{i3}(r, x)\log(s_f) + b_{i4}(r, x)[\log(s_f)]^2,$$

and the functions (b) are specified as follows:

$$b_{ik}(r, x) = a_{ik0} + a_{ik1}r + a_{ik2}r^2 + a_{ik3}r^3 + a_{ik4}r^4 + a_{ik5}r^5 +$$
$$a_{ik6}r^6 + a_{ik7}x + a_{ik8}x^2 + a_{ik9}x^3 + a_{ik10}x^4 + a_{ik11}rx +$$

-continued $$a_{ik12}rx^2 + a_{ik13}rx^3 + a_{ik14}rx^4 + a_{ik15}r^2x + a_{ik16}r^2x^2 +$$
$$a_{ik17}r^2x^3 + a_{ik18}r^2x^4 + a_{ik19}r^3x + a_{ik20}r^3x^2 + a_{ik21}r^3x^3 +$$
$$a_{ik22}r^4x + a_{ik23}r^4x^2 + a_{ik24}r^5x + a_{ik25}(1/r) + a_{ik26}\mathrm{sqrt}(r) +$$
$$a_{ik27}\mathrm{sqrt}(x) + a_{ik28}\mathrm{sqrt}(rx) + a_{ik29}\log(r).$$

The coefficients (a) are constants, and have different numerical values for each receiver. In the above expressions log denotes the natural logarithm, and sqrt the square root. An expression similar to $R(s_m, s_f, r, x)$ is used to compute the imaginary part (quadrature component) of $V_{model}$. In the correction module, 40a7 in FIG. 6, the subroutines VDM06D, ..., VDM72C evaluate expressions of this type to compute $V_{model}$ for each receiver and each frequency.

The model's eight complex numbers $Vj_{model}$, $j=1, \ldots, 8$, are transmitted back to the solver 40a4. Recall that the eight complex numbers $Vj_{meas}$, $j=1, \ldots, 8$, were already passed directly to the solver 40a4. The solver 40a4 compares $V_{model}$ with $V_{meas}$ to determine if $V_{model}$ most nearly matches $V_{meas}$, the solver 40a4 using the following least squares criterion:

$$E(s_f, x) = \sum_{j=1}^{8} \frac{1}{e_j} |V^j_{meas} - V^j_{model} - V^j_{homog}|^2$$

where $$e_j = 0.01\,\mathrm{Re}(Vj_{meas}) + 0.03\,|\mathrm{Im}(Vj_{meas})| + 0.004$$

Here $Vj_{homog}$ is the voltage that would be recorded on channel j in an infinite homogeneous medium with a conductivity $s_f$. The expression for $e_j$ is an estimate of the standard deviation in the measurement for channel j. In the expression for $E(s_f, x)$, the summation over j extends from 1 through 8, which corresponds to voltages recorded on the four receivers closest to the transmitter. By restricting the summation to the first eight channels, one obtains a better estimate of the formation conductivity close o the borehole. For the off-center AIT, the borehole signal is affected by the formation conductivity, and depends primarily on the formation conductivity immediately surrounding the borehole.

Theoretically, if $Vj_{meas} = Vj_{model} + Vj_{homog}$ then $E(s_f, x)$ would be zero and the model voltages would match the measured values exactly. The value of $E(s_f, x)$ is stored in solver 40a4.

The solver 40a4 selects a second set of values for the remaining two borehole parameters $s_f$ and r, yielding a second selected set of borehole parameters $s_m$, $s_f$, r, and x. The method used to select a new set of values for $s_f$ and r is the Levenberg-Marquard optimization method described in the following reference: D. W. Marquard, Journal of the Society of Industrial and Applied Mathematics, Volume 11, pages 431–441, 1963. The second selected set of borehole parameters is passed to the correction module 40a5, and the aforementioned process repeats itself once again. The correction module 40a5 generates a second model which comprises another set of eight complex numbers $Vj_{model}$, $j=1, \ldots, 8$, that are a function of the second selected set of borehole parameters $s_m$, $s_f$, r, and x, the values of $VJ_{model}$ being evaluated by the subroutines VDM06D, VDM72C as before. The eight complex numbers associated with the second model are transmitted backed to solver 40a4 and are compared, therein, with the eight complex numbers associated with V$_{meas}$, using the least squares criterion described above. Another resultant value of E(s$_f$,r) is stored in the solver 40a4. The aforementioned process repeats itself until a minimum value of E(s$_f$,r) is found. When E(s$_f$,r) begins to increase, the s$_f$ and r values associated the immediately preceding value of E(s$_f$,r) are determined to be the desired values for the conductivity of the formation (s$_f$) and the radius of the borehole (r).

The objective of the above-referenced iterative process is to select values for s$_f$ and r such that V$_{model}$ most nearly matches V$_{meas}$.

The desired values of s$_f$ and r are passed directly to the final correction module along with the given values of s$_m$ and x, thereby making a final and complete set of borehole parameters s$_m$, s$_f$, r, x. A model voltage (Vj$_{model}$) is evaluated for each channel j by the final correction module 40a7, as a function of the final set of borehole parameters: Vj$_{model}$(s$_m$,s$_f$,r,x). The correction module 40a7 is identical with 40a5, except that it computes Vj$_{model}$ for j=1, ..., 18, whereas 40a5 computes the first 8 values of j only.

The final correction algorithm module 40a7 applies a borehole correction to the eighteen (18) chanels as follows:

$$Vj_{corr} = Vj_{meas} - Vj_{model}(s_m, s_f, r, x), j = 1, \ldots, 18.$$

Vj$_{corr}$ represents the "borehole corrected data", a set of 18 corrected complex voltages output from the final correction algorithm 40a6.

In summary, Vj$_{meas}$ represents the complex voltage in the 18 receiver channel coils 18 and is contaminated by a contribution from the bore hole fluid ; whereas Vj$_{model}$(s$_m$,s$_f$,r,x) represents the value predicted by the model for the contribution of the conductive borehole fluid. Vj$_{corr}$ represents the complex voltage in the 18 channels WITHOUT the effect of the conductive borehole fluid. The AIT data are therefore automatically corrected to represent the true formation conductivity and are not contaminated by the conductivity of the mud in the borehole.

Figure 7:
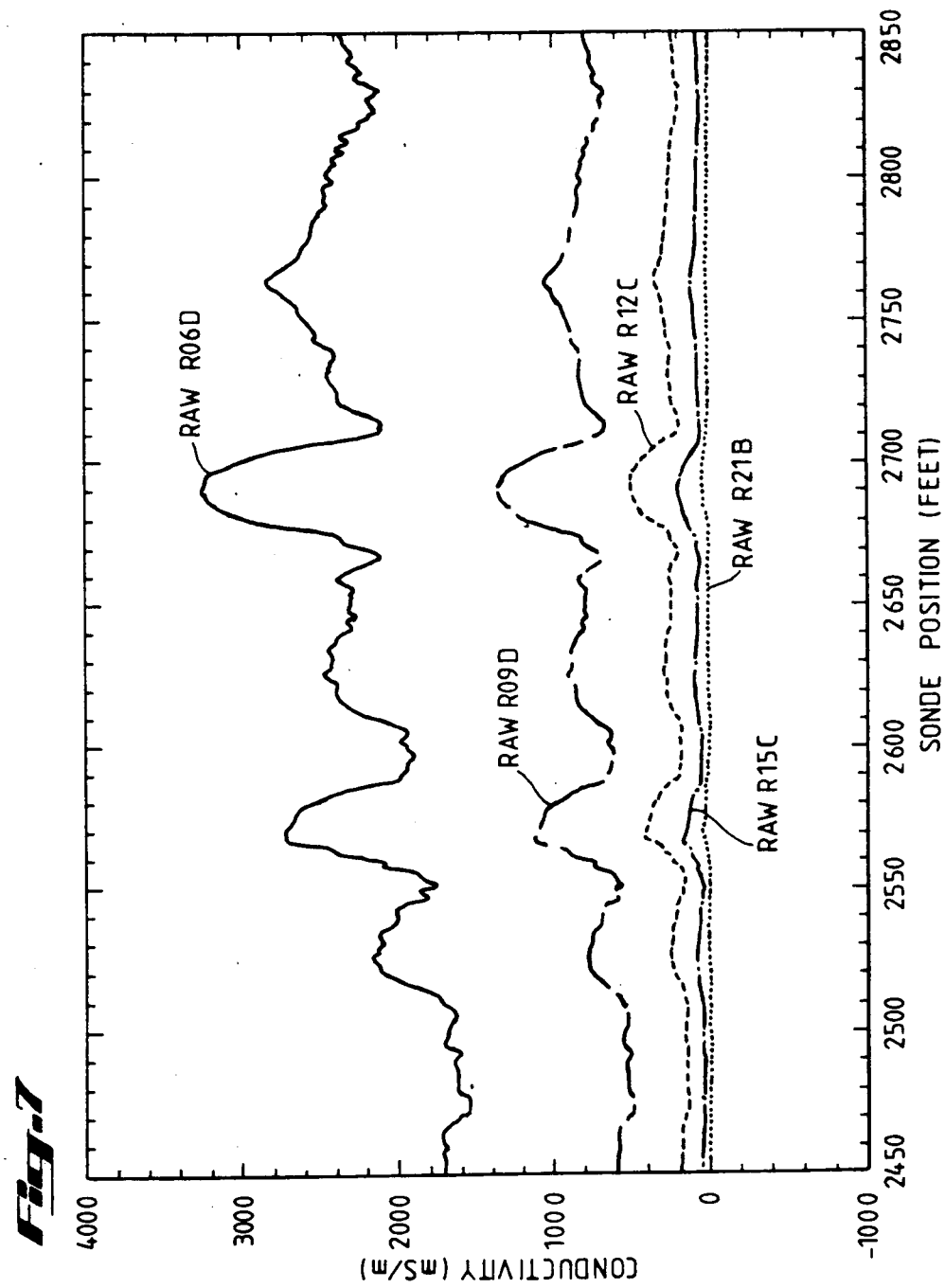
FIG. 7 illustrates raw signals recorded by an AIT tool in a borehole of an oil well where the formation conductivity is less than 25 ms/m.
Figure 8:
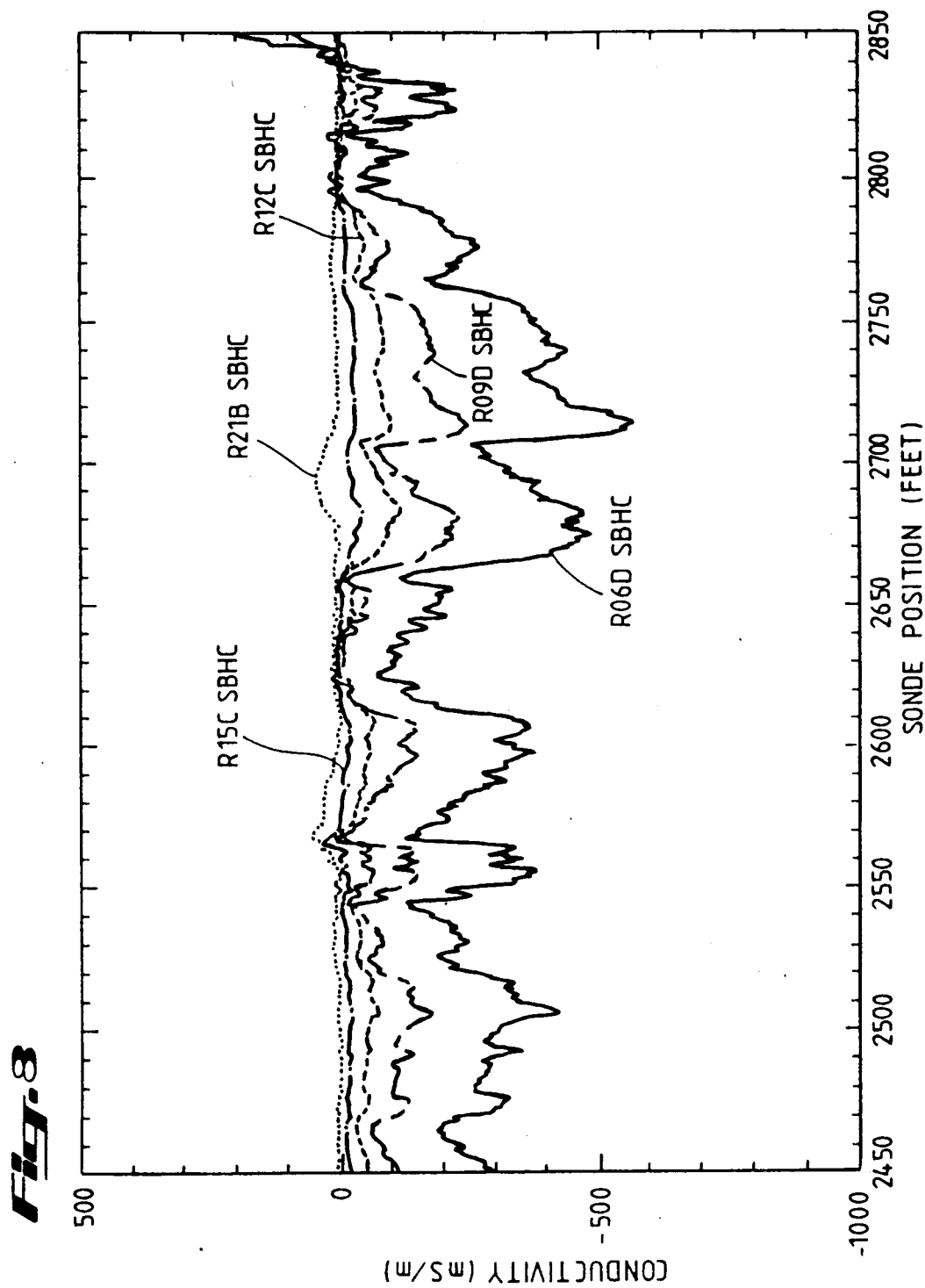
FIG. 8 illustrates the AIT raw data signals after a simple borehole correction.

The AIT borehole correction software (hereinafter called the "BORCOR" program) was tested by performing a log in a well with an irregular borehole in a low-conductivity chalk formation. The results are shown in FIGS. 7 though 10. FIG. 7 shows the the raw signals recorded by the AIT in a 400-foot section of the well where the formation conductivity is known to be less than 25 mS/m. The mud conductivity in this section of the well is about 14000 mS/m. FIG. 8 shows the AIT signals after a simple borehole correction assuming a constant formation conductivity, and using a borehole radius as determined by a mechanical caliper. The borehole signal has been greatly reduced, but there are residual errors of the order of up to 500 mS/m. FIG. 9 shows the AIT signals after a borehole correction where the borehole radius and the formation conductivity are simultaneously optimized by the nonlinear least squares procedure in the BORCOR program. The residual errors have now been reduced to less than 100 mS/m, or than 2 percent of the raw signal in FIG. 7. The borehole radius determined by the optimization in BORCOR is compared in FIG. 10 to the diameter recorded by the mechanical caliper. One reason that the least squares procedure gives better results can be seen in FIG. 10; the mechanical caliper has limited resolution, its accuracy is limited by inertia, and its readings have a coarse quantization. The optimized borehole corrections can better cope with a borehole whose cross-section is elliptical or irregular.

APPENDIX A

The purpose of this appendix is to describe fully the organization of the borehole correction software and explain the usage and purpose of each subroutine and each variable within those subroutines. The document is divided into sections called Prologues which describe each subprogram of the software. Each Prologue contains a general description of the routine, and an explanation of all of the variables and arrays used.

Following the prologues is a source listing for both versions of the software, centered and decentered, including the driver routines.

The driver routine must be written to accomodate the format of the input logs. The driver is very simple to write; only the routine BORCOR needs to be called, all other routines described in this document are called internally by BORCOR. Common blocks are all internal to BORCOR.

Prologue for BORCOR: A Borehole Correction Routine for the AIT

PURPOSE

Correct a stream of raw centered or decentered AIT signals (in S/m) for the borehole effect.

DESCRIPTION

This routine uses a set of polynomials representing the forward model of the borehole effect on the AIT to infer a correction factor based on the measured response and on three borehole parameters, namely, the borehole radius RADHOL, the tool standoff STNDFF, and the borehole (mud) conductivity SIGMUD.

The forward model gives the response of the tool to an infinite bed, with conductivity SIGFOR, traversed by a borehole. The correction, then, is taken to be the difference between this response and the response to the same formation without a borehole. These responses, functions of the four variables SIGFOR, SIGMUD, RADHOL and STNDFF, have been calculated by a code called INDECC, and extensive tables of the results were set up. The polynomial representations of this data were then generated using a linear least squares optimization.

The routine finds the optimum SIGFOR such that the predicted response matches the measured response for a subset of the channels, by minimizing the sum of the squares of a weighted difference between the measured response and the predicted response using a routine called SNLS1. (See the prologue for SNLS1.) This optimized SIGFOR is then used to make the correction, which is the difference between the predicted value (a function of SIGFOR) and the value for a homogeneous medium of conductivity SIGFOR. A switch is provided to allow the direct input of the formation conductivity for cases when it is desired to use another measurement, e.g., an SFL, avoiding the optimizing routine SNLS1..

The subset of channels used may vary according to the anticipated environment. It is desirable to get an estimate of the conductivity immediately outside the borehole walls because this is the conductivity that has the strongest effect on the borehole signal. That would imply using only the shortest arrays in the presence of shallow invasion, for instance. However, it may be desirable to use a larger number of arrays for a more robust estimate, for example, in a rugose hole. The source code listed at the end of this document uses the shortest eight channels. In the future it may be desirable to include a switch which dynamically tells the code how many channels to use.

The measured values are passed to BORCOR without depth adjustment, that is, at a common transmitter point. These values are put into the 'bottom' of a circular buffer matrix (VMAT). A pointer for each array keeps track of the correct position for which the data are on depth. Another pointer points to the 'bottom' of the buffer. After a correction is made, the routine returns the data in the 'top' row of the buffer, which will be completely corrected, and decrements the 'bottom' pointer.

Note: The code that corrects centered data is identical to that which corrects decentered data, except all references to the variable STNDFF are taken out, and the correction polynomials are different. Two variable names change, RXFLAG becomes RFLAG, and NEWRX becomes NEWR. The subroutines DRXEVAL and DSMFEVAL become CREVAL and CSMFEVAL, while the VDMxxa's become VCMxxa's. Otherwise, usage and structure are the same.

Note on the naming of the channels: Each channel is referenced with a name of the form Mxxa, where the 'M' stands for metal mandrel, 'xx' is a two digit integer corresponding to the length of the array, and 'a' is a character referring to the frequency of the channel ---
'B' - 26.325 kHz, 'C' - 52.65 kHz, 'D' - 105.3 kHz, 'E' - 210.6 kHz.

BORCOR Argument List

VIN(input):
This is an array containing the 18 complex numbers which are the measured values, to be corrected. The values are ordered as follows: M06D, M06E, M09D, M09E, M12C, M12D, M15C, M15D, M21B, M21C, M27B, M27C, M39B, M39C, M54B, M54C, M72B, M72C.

VOUT(output):
This array containing the 18 complex numbers which are the corrected values, delayed from the input VIN by IZDELAY samples.

IFRST(input):
An integer flag which should be equal to one only on the first call to BORCOR. This enables initialization of the variables and arrays.

ISFOR(input):
An integer flag which determines what formation conductivity is to be used to make the correction. If the flag is zero, then the routine SNLS1 is called and the formation conductivity is optimized to the measured values of the first few channels. In this case XSIGF should be the best guess to the formation conductivity. If the flag is set to one, then the routine assumes that the correct formation conductivity is passed in the parameter XSIGF and the correction is made based on this number.

XSIGM(input):
The borehole conductivity in S/m.

XSIGF(input, output):
If ISFOR equals zero, then on input, this is the best guess for the formation conductivity, in S/m. On output, it is the result of the optimization. If ISFOR equals one, then this is the formation conductivity used in making the correction, and is not changed on output.

XRAD(input):
The borehole radius in inches.

XSTND(input):
The tool standoff in inches.

BORCOR Variables in Common

**DWALL(R*4):**
An additional term was included in the penalty function in the solver. This term is a SINH function that causes the penalty function to get very large as the iterative parameter (SIGFOR) goes negative, preventing the solver from finding a negative result that is not numerically close to zero. DWALL is the coefficient to this SINH function. It is passed in the common block /WALL/ to the penalty function FCN.

**NEWRX(I*4):**
A flag which is passed in the common block /RXFLAG/ to the polynomial evaluation functions, indicating whether or not the radius or standoff have changed. If they haven't changed, then the functions can be computed much more quickly since they can use the terms that have already been evaluated.

SIGMUD(R*4):
The borehole mud conductivity, passed to penalty function FCN through the common block /MUD/. FCN needs this parameter because it must call DSMFEVAL since SIGFOR will always change from call to call.

*BORCOR Local Variables*

ATOL(R*4):
This variable is a modification to SNLS1. It is passed to SNLS1 at the end of its argument list and is an input. it gives a fourth convergence criterion to the solver: if the change in the iterate is less than ATOL, then convergence is satisfied. It was necessary to add this convergence test in order to prevent SNLS1 from iterating too long on a bad answer.

EPSFCN(R*4):
See prologue for SNLS1.

FACTOR(R*4):
See prologue for SNLS1.

IFRST(I*4):
See argument list above.

FTOL(R*4):
See prologue for SNLS1.

GTOL(R*4):
See prologue for SNLS1.

INFO(I*4):
See prologue for SNLS1.

IOPT(I*4):
See prologue for SNLS1.

IPTRB(I*4):
This is a pointer that points to the 'bottom' row of the circular buffer, corresponding to the position of the 54" array. As the correction progresses, this pointer is decremented modulo (IZDELAY+1). The row immediately below the 'bottom' row is the 'top' row.

ISFOR(I*4):
See argument list above.

LDFJAC(I*4):
See prologue for SNLS1.

MAXFEV(I*4):
See prologue for SNLS1.

MODE(I*4):
See prologue for SNLS1.

NFEV(I*4):
See prologue for SNLS1.

NJEV(I*4):
See prologue for SNLS1.

NPRINT(I*4):
See prologue for SNLS1.

NUMERR(I*4):
An error flag returned by either DSMFEVAL or DRXEVAL. NUMERR = 101 means the tool decentration is less than zero. The tool decentration is equal to RADHOL - STNDFF - 1.8125. NUMERR = 102 means RADHOL is less than or equal to zero. NUMERR = 103 means SIGMUD is less than zero. For NUMERR = 101 or 102, the code goes ahead and uses the bad values of RADHOL and/or STNDFF and continues, just reporting the error. For NUMERR = 103, the code continues after setting SIGMUD equal to zero, and the error is reported.

RADHOL(R*4):
The borehole radius from the last run of BORCOR. It is compared with XRAD, and if different, DRXEVAL is called and RADHOL is set to XRAD. Otherwise, nothing happens.

STNDFF(R*4):
The tool standoff from the last run of BORCOR. It is compared with XSTND, and if different, DRXEVAL is called and STNDFF is set to XSTND. Otherwise, nothing happens.

XRAD(R*4):
See argument list above.

XSIGF(R*4):
See argument list above.

XSIGM(R*4):
See argument list above.

XSTND(R*4):
See argument list above.

XTOL(R*4):
See prologue for SNLS1.

*BORCOR Array in Common*

VMEAS(C*8):
These are the measured values from the tool, after depth shifting. Passed in the common block /MEAS/ to the penalty function FCN. Should be dimensioned to length NCHAN.

*BORCOR Local Arrays*

DIAG(R*4):
See prologue for SNLS1.

FJAC(R*4):
See prologue for SNLS1.

FVEC(R*4):
See prologue for SNLS1.

IPTR(I*4):
These are pointers that point to the position in the circular buffer at which the measured data should be taken for the respective arrays in order to be on depth. For computer simulated data, these pointers may differ from those required for real field data. They correspond to the distance from the transmitter at which the response for the particular array is the greatest. See the description of IxxSHFT (Parameter Constants) for an explanation of how the pointers are set up for field data.

IPVT(I*4):
See prologue for SNLS1.

QTF(R*4):
See prologue for SNLS1.

VIN(C*8):
See argument list above.

VMAT(C*8):
The circular buffer. The number of columns is equal to the number of channels, and the number of rows is equal to IZDELAY+1. This array is initialized by putting the first input vector (VIN) in each row of the matrix.

VOUT(C*8):
See argument list above.

WA1(R*4):
See prologue for SNLS1.

WA2(R*4):
See prologue for SNLS1.

WA3(R*4):
See prologue for SNLS1.

WA4(R*4):
See prologue for SNLS1.

X(R*4):
The array of parameters to be optimized. In this case the length of the array is 1 and it is taken equal to SIGFOR. A possible extension to this code would be to increase the length of this vector, allowing SNLS1 to optimize not only on SIGFOR, but on RADHOL and/or STNDFF also.

BORCOR Parameter Constants

I06SHFT, I09SHFT, I12SHFT, I15SHFT, I21SHFT, I27SHFT, I39SHFT, I54SHFT, I72SHFT(I*4):

These are the shifts from the pointer IPTRB from which the individual depth adjustment pointers IPTR(I) are derived. See description of the variables IPTR(I) above. The following is an explanation for how the pointers were set up for field data. The point where the response function for the 72 inch array is the largest is about 66 inches above the transmitter, and that for the 54 inch array is 48 inches below the transmitter. The length of the circular buffer VMAT is then IZDELAY + 1 = (66 + 48)/3 + 1 = 39. Since the 54 inch array is the bottom-most array, IPTR(8) will point to the bottom row of the circular buffer, and thus, should always be equal to IPTRB. I54SHFT is a number that corresponds to one more than the number of elements in the buffer from IPTRB to IPTR(8). Therefore, I54SHFT = 1. The extra one is added to compensate for the modulo IZDELAY arithmetic used to derive the pointers. Since the 72 inch array is the top-most array, IPTR(9) will point to the top row of the circular buffer, and thus should be equal to (IPTRB - 1 modulo 39) + 1, or I72SHFT = 39. Here are the maximum response points for the rest of the arrays, and the corresponding IxxSHFT:

| array length | Max Response (distance from transmitter) | IxxSHFT |
|---|---|---|
| 6" | 6" above | 19 |
| 9" | 9" below | 14 |
| 12" | 12" above | 21 |
| 15" | 15" below | 12 |
| 21" | 18" above | 23 |
| 27" | 24" below | 9 |
| 39" | 33" above | 28 |
| 54" | 48" below | 1 |
| 72" | 66" above | 39 |

IZDELAY(I*4):
This is the delay in number of samples that the borehole correction code will impose on the log. It corresponds to the distance (in number of samples, i.e. inches divided by 3) between the points where the 54" and 72" arrays see into the formation (the points where the response function for the two arrays is greatest).

M(I*4):
The number of terms in the penalty function to be minimized.

N(I*4):
The number of parameters to be varied by SNLS1 to minimize the penalty function.

NCHAN(I*4):
The number of channels for the tool.

*BORCOR Functions and Subroutines Referenced*

FCN:
Passed as a parameter to SNLS1, this is the routine that calculates the terms of the penalty function to be minimized. See the prologue for SNLS1 and FCN.

DRXEVAL, DSMFEVAL:
These routines collectively evaluate all of the terms required by the correction polynomials and puts them in the common blocks /RXTERMS/ and /SMFTERMS/ for access by the polynomial functions. See prologues.

SNLS1:
The solver routine. See its prologue.

VDM06D, VDM06E, VDM09D, VDM09E, VDM12C, VDM12D, VDM15C, VDM15D, VDM21B, VDM21C, VDM27B, VDM27C, VDM39B, VDM39C, VDM54B, VDM54C, VDM72B, VDM72C:
The correction polynomials.

XSETF:
This SLATEC routine sets the XERROR parameters to prevent SNLS1 from bombing unnecessarily. See SLATEC documentation.

Prologue for FCN

DESCRIPTION

This routine calculates the terms of the penalty function as required for SNLS1. It is written in accordance with the specifications recorded in the prologue for SNLS1. The first sixteen terms are the real and imaginary parts of the difference between the measured values for the eight shorter arrays and the predicted values for the given SIGFOR, divided by a weighting factor. The seventeenth term is a SINH function which contributes only when SIGFOR is negative, thus providing a mechanism to prevent SNLS1 from finding a negative result for SIGFOR. The penalty function itself is the sum of the squares of each of these terms, and is provided to the output device when the routine is called with the print flag turned on.

FCN Argument List

IFLAG(input):
The print flag. When it is zero, the routine prints the terms of the penalty function, in addition to the sum of squares of these terms instead of calculating the residual vector.

M(input):
The number of terms in the penalty function.

N(input):
The number of parameters to vary. For this case, N = 1.

X(input):
The vector of length N containing the varied parameters.

FVEC(output):
The vector of length M containing the terms of the penalty function.

DUM, IDUM:
Dummy parameters.

FCN Variables in Common

DWALL(R*4):

Coefficient of SINH function, set in a calling routine and passed in through the common block /WALL/, which prevents SIGFOR from going negative.

NEWRX(I*4):

Flag passed in through the common block /RXFLAG/ which, when set to one, causes the polynomials to reevaluate the RADHOL and STNDFF dependencies. This flag is set to zero immediately after the polynomials are called since RADHOL and STNDFF cannot change while SNLS1 is running.

SIGMUD(R*4):

The borehole mud conductivity, passed through the common block /MUD/.

*FCN Local Variables*

DUM(R*4):
See argument list above.

IDUM(I*4):
See argument list above.

IFLAG(I*4):
See argument list above.

M(I*4):
See argument list above.

N(I*4):
See argument list above.

NSCHAN(I*4):

Number of shorter channels used in the optimization for the effective formation conductivity. Calculated from the value of M passed into the routine by the formula NSCHAN = (M - 1)/2. M should be odd to account for the SINH function added on at the end.

NUMERR(I*4):
See prologue for DSMFEVAL.

SIGFOR(R*4):

The formation conductivity, also the iterative parameter.

SSQ(R*4):

The penalty function, which is the sum of squares of the weighted differences between measured and predicted values. Used only if IFLAG is zero, for printing purposes.

*FCN Array In-Common*

VMEAS(C*8):

The measured values for the various arrays, on depth. Passed in through the common block /MEAS/.

FCN Local Arrays

FVEC(R*4):
See argument list above.

VEPS(C*8):
The weights for the differences in the penalty function. Dimensioned to length NCHAN, but only the values corresponding to the shorter arrays are used, in general.

VHOM(C*8):
The homogeneous medium values for the various arrays. Dimensioned to length NCHAN.

VMILES(C*8):
The predicted tool responses for the various arrays for a given SIGFOR. Each is equal to the sum of the correction polynomial result and the homogeneous medium value. Dimensioned to length NCHAN.

X(R*4):
See argument list above.

FCN Parameter Constant

NCHAN(I*4):
The number of channels for the tool.

FCN Functions and Subroutines Referenced

HERMIT:
Evaluates the homogeneous medium values. See its prologue.

DSMFEVAL:
Evaluates terms in SIGMUD and SIGFOR for the correction polynomials.

VDM06D, VDM06E, VDM09D, VDM09E, VDM12C, VDM12D, VDM15C, VDM15D:
The correction polynomial functions.

Prologue for DRXEVAL

DESCRIPTION

This routine calculates all of the terms associated with the borehole radius and the tool stndff (RADHOL and STNDFF). The terms are calculated in as telescopic a fashion as possible, in order to minimize the number of multiplications required to calculate them. These terms are put in the common block /RXTERMS/ which is accessed by the correction polynomials. This is done to allow the correction polynomials to be evaluated as quickly as possible. This routine need only be called if either RADHOL or STNDFF changes.

*DRXEVAL Argument List*

RADHOL(input):
The borehole radius.

STNDFF(input):
The tool standoff.

NUMERR(output):
An error flag. If the tool decentration is less than zero, then NUMERR is set to 101 and the routine returns. If the borehole radius is less than or equal to zero, then NUMERR is set to 102 and the routine returns.

*DRXEVAL Variables in Common*

R(R*4):
RADHOL.

R2(R*4):
RADHOL^2.

R2X(R*4):
RADHOL^2*STNDFF.

R2X2(R*4):
RADHOL^2*STNDFF^2.

R2X3(R*4):
RADHOL^2*STNDFF^3.

R2X4(R*4):
RADHOL^2*STNDFF^4.

R3(R*4):
RADHOL^3.

R3X(R*4):
RADHOL^3*STNDFF.

R3X2(R*4):
RADHOL^3*STNDFF^2.

R3X3(R*4):
RADHOL^3*STNDFF^3.

R4(R*4):
RADHOL^4.

R4X(R*4):
RADHOL^4*STNDFF.

R4X2(R*4):
RADHOL^4*STNDFF^2.

R5(R*4):
RADHOL^5.

R5X(R*4):
RADHOL^5*STNDFF.

RINV(R*4):
1/RADHOL.

RX(R*4):
RADHOL*STNDFF.

RX2(R*4):
RADHOL*STNDFF^2.

RX3(R*4):
RADHOL*STNDFF^3.

RX4(R*4):
RADHOL*STNDFF^4.

SQRTR(R*4):
Square root of RADHOL.

SQRTRX(R*4):
Square root of RADHOL*STNDFF.

SQRTX(R*4):
Square root of STNDFF.

X(R*4):
STNDFF.

X2(R*4):
STNDFF^2.

X3(R*4):
STNDFF^3.

X4(R*4):
STNDFF^4.

*DRXEVAL Local Variables*

DECENT(R*4):
The tool decentration. DECENT = RADHOL - STNDFF - 1.8125, where 1.8125 is the tool radius in inches.

NUMERR(I*4):
See argument list above.

RADHOL(R*4):
See argument list above.

STNDFF(R*4):
See argument list above.

Prologue for DSMFEVAL

DESCRIPTION

This routine calculates all of the terms associated with the borehole mud conductivity and the formation conductivity (SIGMUD and SIGFOR). The terms are calculated in as telescopic a fashion as possible, in order to minimize the number of multiplications required to calculate them. These terms are put in the common block /SMFTERMS/ which is accessed by the correction polynomials. This is done to allow the correction polynomials to be evaluated as quickly as possible. This routine need only be called if either SIGMUD or SIGFOR changes.

DSMFEVAL Argument List

SIGMUD(input):
The borehole mud conductivity.

SIGFOR(input):
The formation conductivity.

NUMERR(output):
An error flag. If the SIGMUD is less than zero, then NUMERR is set to 103 and the routine returns.

DSMFEVAL Variables in Common

DIF2(R*4):
(SIGMUD - SIGFOR)^2

RAT(R*4):
(SIGMUD - SIGFOR)/(SIGMUD + SIGFOR)*(SIGMUD - SIGFOR)

RAT2(R*4):
(SIGMUD - SIGFOR)^2/(SIGMUD + SIGFOR)^2*(SIGMUD - SIGFOR)

RAT3(R*4):
(SIGMUD - SIGFOR)^3/(SIGMUD + SIGFOR)^3*(SIGMUD - SIGFOR)

RAT4(R*4):
(SIGMUD - SIGFOR)^4/(SIGMUD + SIGFOR)^4*(SIGMUD - SIGFOR)

RSF(R*4):
SQRT(|SIGFOR|)*(SIGMUD - SIGFOR)

RSF3(R*4):
SIGFOR*SQRT(|SIGFOR|)*(SIGMUD - SIGFOR)

RSFDIF2(R*4):

SQRT(|SIGFOR|)*(SIGMUD - SIGFOR)^2

RSFRAT(R*4):
SQRT(|SIGFOR|)*(SIGMUD - SIGFOR)/(SIGMUD + SIGFOR)*(SIGMUD - SIGFOR)

RSFRAT2(R*4):
SQRT(|SIGFOR|)*(SIGMUD - SIGFOR)^2/(SIGMUD + SIGFOR)^2*(SIGMUD - SIGFOR)

RSFRAT3(R*4):
SQRT(|SIGFOR|)*(SIGMUD - SIGFOR)^3/(SIGMUD + SIGFOR)^3*(SIGMUD - SIGFOR)

RSFRAT4(R*4):
SQRT(|SIGFOR|)*(SIGMUD - SIGFOR)^4/(SIGMUD + SIGFOR)^4*(SIGMUD - SIGFOR)

RSFSM(R*4):
SQRT(|SIGFOR|)*SIGMUD*(SIGMUD - SIGFOR)

RSFSM2(R*4):
SQRT(|SIGFOR|)*SIGMUD^2*(SIGMUD - SIGFOR)

SF(R*4):
SIGFOR*(SIGMUD - SIGFOR)

SFDIF2(R*4):
SIGFOR*(SIGMUD - SIGFOR)^2

SFRAT(R*4):
SIGFOR*(SIGMUD - SIGFOR)/(SIGMUD + SIGFOR)*(SIGMUD - SIGFOR)

SFRAT2(R*4):
SIGFOR*(SIGMUD - SIGFOR)^2/(SIGMUD + SIGFOR)^2*(SIGMUD - SIGFOR)

SFRAT3(R*4):
SIGFOR*(SIGMUD - SIGFOR)^3/(SIGMUD + SIGFOR)^3*(SIGMUD - SIGFOR)

SFRAT4(R*4):
SIGFOR*(SIGMUD - SIGFOR)^4/(SIGMUD + SIGFOR)^4*(SIGMUD - SIGFOR)

SFSM(R*4):
SIGFOR*SIGMUD*(SIGMUD - SIGFOR)

SFSM2(R*4):
SIGFOR*SIGMUD^2*(SIGMUD - SIGFOR)

SIGDIF(R*4):
SIGMUD - SIGFOR

SM(R*4):
SIGMUD*(SIGMUD - SIGFOR)

SM2(R*4):
SIGMUD^2*(SIGMUD - SIGFOR)

SM3(R*4):
SIGMUD^3*(SIGMUD - SIGFOR)

XLSF(R*4):
LOG10(|SIGFOR|)*(SIGMUD - SIGFOR)

XLSFRAT(R*4):
LOG10(|SIGFOR|)*(SIGMUD - SIGFOR)/(SIGMUD + SIGFOR)*(SIGMUD - SIGFOR)

XLSFRAT2(R*4):
LOG10(|SIGFOR|)*(SIGMUD - SIGFOR)^2/(SIGMUD + SIGFOR)^2*(SIGMUD - SIGFOR)

XLSFRAT3(R*4):
LOG10(|SIGFOR|)*(SIGMUD - SIGFOR)^3/(SIGMUD + SIGFOR)^3*(SIGMUD - SIGFOR)

XLSFRAT4(R*4):
LOG10(|SIGFOR|)*(SIGMUD - SIGFOR)^4/(SIGMUD + SIGFOR)^4*(SIGMUD - SIGFOR)

XLSIGFOR(R*4):
LOG10(|SIGFOR|)

XLSMLSF2(R*4):
LOG10(|SIGMUD|)*LOG10(|SIGFOR|)^2*(SIGMUD - SIGFOR)

XLSMLSF2RAT2(R*4):
LOG10(|SIGMUD|)*LOG10(|SIGFOR|)^2*(SIGMUD - SIGFOR)^2/(SIGMUD + SIGFOR)^2*(SIGMUD - SIGFOR)

DSMFEVAL Local Variables

NUMERR(I*4):
See argument list above.

SIGFOR(R*4):
See argument list above.

SIGMUD(R*4): —
See argument list above.

SIGRAT(R*4):
(SIGMUD - SIGFOR)/(SIGMUD + SIGFOR)

Prologue for Correction Polynomials

DESCRIPTION

These functions use the terms calculated by DSMFEVAL and DRXEVAL to generate the borehole correction polynomials. These terms are passed in through the common blocks /SMFTERMS/ and /RXTERMS/.

Correction Polynomial Argument List

NEWRX:
This is an integer flag which, if set to 1, causes the function to go ahead and recalculate the polynomials in RADHOL and STNDFF. Otherwise, they are assumed unchanged, and therefore need not be calculated again.

Correction Polynomial Variables

Note: All of the variables in the common blocks are described in the prologues for DRXEVAL and DSMFEVAL.

NEWRX(I*4):
See argument list above.

SUM(R*4):
Variable used to sum the RADHOL and STNDFF terms for the polynomials.

SUMR(R*4):
The sum for the real part of the final answer.

SUMX(R*4):
The sum for the imaginary part of the final answer.

Correction Polynomial Arrays

AR(R*4):
The array containing the terms in RADHOL and STNDFF for the real part of the final result, before the coefficients are multiplied.

AX(R*4):
The array containing the terms in RADHOL and STNDFF for the imaginary part of the final result, before the coefficients are multiplied.

BR(R*4):
The sum over the RADHOL and STNDFF terms for the real part of the function, the elements of which become the coefficients for the SIGMUD and SIGFOR terms.

BX(R*4):

The sum over the RADHOL and STNDFF terms for the imaginary part of the function, the elements of which become the coefficients for the SIGMUD and SIGFOR terms.

COEFFR(R*4):
The coefficients for the real part of the polynomial, provided by data statements.

COEFFX(R*4):
The coefficients for the imaginary part of the polynomial, provided by data statements.

CR(R*4):
The terms in SIGMUD and SIGFOR that get multiplied by the BR's to arrive at the real part of the final function value.

CX(R*4):
The terms in SIGMUD and SIGFOR that get multiplied by the BX's to arrive at the imaginary part of the final function value.

Prologue for HERMIT

DESCRIPTION

This routine, written by G. Minerbo, calculates the homogeneous medium response of a specified channel by cubic Hermite interpolation of GST tables calculated by the code MBORN. An explanation of this method may be found in the *Handbook of Mathematical Functions* by Abramowitz and Stegun.

HERMIT Argument List

JCHINP(input, I*4):
This is an integer from 1 to NCHAN which identifies the channel for which the response is to be calculated.

SIGINP(input, R*4):
The formation conductivity.

CVOHER(output, C*8):
The complex response of channel JCHINP to a homogeneous formation of conductivity SIGINP.

```
      SUBROUTINE SNLS1(FCN,IOPT,M,N,X,FVEC,FJAC,LDFJAC,FTOL,XTOL,GTOL,
     1    MAXFEV,EPSFCN,DIAG,MODE,FACTOR,NPRINT,INFO,NFEV,NJEV,IPVT,QTF,
     2    WA1,WA2,WA3,WA4)
C***BEGIN PROLOGUE   SNLS1

C***CATEGORY NO.  K1B1A1,K1B1A2
C***KEYWORDS  LEVENBERG-MARQUARDT,NONLINEAR DATA FITTING,
C             NONLINEAR LEAST SQUARES

C***PURPOSE   SNLS1 minimizes the sum of the squares of M nonlinear
C             functions in N variables by a modification of the
C             Levenberg-Marquardt algorithm.
C
C***DESCRIPTION
C
C 1. Purpose.
C
C       The purpose of SNLS1 is to minimize the sum of the squares of M
C       nonlinear functions in N variables by a modification of the
C       Levenberg-Marquardt algorithm. The user must provide a subrou-
C       tine which calculates the functions. The user has the option
C       of how the Jacobian will be supplied. The user can supply the
C       full Jacobian, or the rows of the Jacobian (to avoid storing
C       the full Jacobian), or let the code approximate the Jacobian by
C       forward-differencing.
C
C
C
C
C 2. Subroutine and Type Statements.
C
```

```
C     SUBROUTINE SNLS1(FCN,IOPT,M,N,X,FVEC,FJAC,LDFJAC,FTOL,XTOL,
C    *                 GTOL,MAXFEV,EPSFCN,DIAG,MODE,FACTOR,NPRINT,INFO
C    *                 ,NFEV,NJEV,IPVT,QTF,WA1,WA2,WA3,WA4)
C     INTEGER IOPT,M,N,LDFJAC,MAXFEV,MODE,NPRINT,INFO,NFEV,NJEV
C     INTEGER IPVT(N)
C     REAL FTOL,XTOL,GTOL,EPSFCN,FACTOR
C     REAL X(N),FVEC(M),FJAC(LDFJAC,N),DIAG(N),QTF(N),
C    *     WA1(N),WA2(N),WA3(N),WA4(M)
C
C
C 3. Parameters.
C
C     Parameters designated as input parameters must be specified on
C     entry to SNLS1 and are not changed on exit, while parameters
C     designated as output parameters need not be specified on entry
C     and are set to appropriate values on exit from SNLS1.
C
C     FCN is the name of the user-supplied subroutine which calculates
C       the functions.  If the user wants to supply the Jacobian
C       (IOPT=2 or 3), then FCN must be written to calculate the
C       Jacobian, as well as the functions.  See the explanation
C       of the IOPT argument below.
C       If the user wants the iterates printed (NPRINT positive), then
C       FCN must do the printing.  See the explanation of NPRINT
C       below.  FCN must be declared in an EXTERNAL statement in the
C       calling program and should be written as follows.
C
C
C       SUBROUTINE FCN(IFLAG,M,N,X,FVEC,FJAC,LDFJAC)
C       INTEGER IFLAG,LDFJAC,M,N
C       REAL X(N),FVEC(M)
C       ----------
C       FJAC and LDFJAC may be ignored     , if IOPT=1.
C       REAL FJAC(LDFJAC,N)                , if IOPT=2.
C       REAL FJAC(N)                       , if IOPT=3.
C       ----------
C         If IFLAG=0, the values in X and FVEC are available
C         for printing.  See the explanation of NPRINT below.
C         IFLAG will never be zero unless NPRINT is positive.
C         The values of X and FVEC must not be changed.
C       RETURN
C       ----------
C         If IFLAG=1, calculate the functions at X and return
C         this vector in FVEC.
C       RETURN
C       ----------
C         If IFLAG=2, calculate the full Jacobian at X and return
C         this matrix in FJAC.  Note that IFLAG will never be 2 unless
C         IOPT=2.  FVEC contains the function values at X and must
C         not be altered.  FJAC(I,J) must be set to the derivative
C         of FVEC(I) with respect to X(J).
C       RETURN
C       ----------
C         If IFLAG=3, calculate the LDFJAC-th row of the Jacobian
C         and return this vector in FJAC.  Note that IFLAG will
C         never be 3 unless IOPT=3.  FVEC contains the function
C         values at X and must not be altered.  FJAC(J) must be
```

```
C          set to the derivative of FVEC(LDFJAC) with respect to X(J).
C        RETURN
C        ----------
C        END
C
C
C
C        The value of IFLAG should not be changed by FCN unless the
C        user wants to terminate execution of SNLS1. In this case, set
C        IFLAG to a negative integer.
C
C
C      IOPT is an input variable which specifies how the Jacobian will
C        be calculated. If IOPT=2 or 3, then the user must supply the
C        Jacobian, as well as the function values, through the
C        subroutine FCN. If IOPT=2, the user supplies the full
C        Jacobian with one call to FCN. If IOPT=3, the user supplies
C        one row of the Jacobian with each call. (In this manner,
C        storage can be saved because the full Jacobian is not stored.)
C        If IOPT=1, the code will approximate the Jacobian by forward
C        differencing.
C
C      M is a positive integer input variable set to the number of
C        functions.
C
C      N is a positive integer input variable set to the number of
C        variables. N must not exceed M.
C
C      X is an array of length N. On input, X must contain an initial
C        estimate of the solution vector. On output, X contains the
C        final estimate of the solution vector.
C
C      FVEC is an output array of length M which contains the functions
C        evaluated at the output X.
C
C      FJAC is an output array. For IOPT=1 and 2, FJAC is an M by N
C        array. For IOPT=3, FJAC is an N by N array. The upper N by N
C        submatrix of FJAC contains an upper triangular matrix R with
C        diagonal elements of nonincreasing magnitude such that
C
C              T        T          T
C           P *(JAC *JAC)*P  =  R *R,
C
C        where P is a permutation matrix and JAC is the final calcu-
C        lated Jacobian. Column J of P is column IPVT(J) (see below)
C        of the identity matrix. The lower part of FJAC contains
C        information generated during the computation of R.
C
C      LDFJAC is a positive integer input variable which specifies
C        the leading dimension of the array FJAC. For IOPT=1 and 2,
C        LDFJAC must not be less than M. For IOPT=3, LDFJAC must not
C        be less than N.
C
C      FTOL is a non-negative input variable. Termination occurs when
C        both the actual and predicted relative reductions in the sum
C        of squares are at most FTOL. Therefore, FTOL measures the
C        relative error desired in the sum of squares. Section 4 con-
C        tains more details about FTOL.
```

```
c
c       XTOL is a non-negative input variable. Termination occurs when
c          the relative error between two consecutive iterates is at most
c          XTOL. Therefore, XTOL measures the relative error desired in
c          the approximate solution. Section 4 contains more details
c          about XTOL.
c
c       GTOL is a non-negative input variable. Termination occurs when
c          the cosine of the angle between FVEC and any column of the
c          Jacobian is at most GTOL in absolute value. Therefore, GTOL
c          measures the orthogonality desired between the function vector
c          and the columns of the Jacobian. Section 4 contains more
c          details about GTOL.
c
c       MAXFEV is a positive integer input variable. Termination occurs
c          when the number of calls to FCN to evaluate the functions
c          has reached MAXFEV.
c
c       EPSFCN is an input variable used in determining a suitable step
c          for the forward-difference approximation. This approximation
c          assumes that the relative errors in the functions are of the
c          order of EPSFCN. If EPSFCN is less than the machine preci-
c          sion, it is assumed that the relative errors in the functions
c          are of the order of the machine precision. If IOPT=2 or 3,
c          then EPSFCN can be ignored (treat it as a dummy argument).
c
c       DIAG is an array of length N. If MODE = 1 (see below), DIAG is
c          internally set. If MODE = 2, DIAG must contain positive
c          entries that serve as implicit (multiplicative) scale factors
c          for the variables.
c
c       MODE is an integer input variable. If MODE = 1, the variables
c          will be scaled internally. If MODE = 2, the scaling is speci-
c          fied by the input DIAG. Other values of MODE are equivalent
c          to MODE = 1.
c
c       FACTOR is a positive input variable used in determining the ini-
c          tial step bound. This bound is set to the product of FACTOR
c          and the Euclidean norm of DIAG*X if nonzero, or else to FACTOR
c          itself. In most cases FACTOR should lie in the interval
c          (.1,100.). 100. is a generally recommended value.
c
c       NPRINT is an integer input variable that enables controlled
c          printing of iterates if it is positive. In this case, FCN is
c          called with IFLAG = 0 at the beginning of the first iteration
c          and every NPRINT iterations thereafter and immediately prior
c          to return, with X and FVEC available for printing. Appropriate
c          print statements must be added to FCN (see example) and
c          FVEC should not be altered. If NPRINT is not positive, no
c          special calls to FCN with IFLAG = 0 are made.
c
c       INFO is an integer output variable. If the user has terminated
c          execution, INFO is set to the (negative) value of IFLAG. See
c          description of FCN and JAC. Otherwise, INFO is set as follows.
c
c          INFO = 0  improper input parameters.
c
c
```

```
C         INFO = 1  both actual and predicted relative reductions in the
C                   sum of squares are at most FTOL.
C
C         INFO = 2  relative error between two consecutive iterates is
C                   at most XTOL.
C
C         INFO = 3  conditions for INFO = 1 and INFO = 2 both hold.
C
C         INFO = 4  the cosine of the angle between FVEC and any column
C                   of the Jacobian is at most GTOL in absolute value.
C
C         INFO = 5  number of calls to FCN for function evaluation
C                   has reached MAXFEV.
C
C         INFO = 6  FTOL is too small. No further reduction in the sum
C                   of squares is possible.
C
C         INFO = 7  XTOL is too small. No further improvement in the
C                   approximate solution X is possible.
C
C         INFO = 8  GTOL is too small. FVEC is orthogonal to the
C                   columns of the Jacobian to machine precision.
C
C         Sections 4 and 5 contain more details about INFO.
C
C      NFEV is an integer output variable set to the number of calls to
C         FCN for function evaluation.
C
C      NJEV is an integer output variable set to the number of
C         evaluations of the full Jacobian. If IOPT=2, only one call to
C         FCN is required for each evaluation of the full Jacobian.
C         If IOPT=3, the M calls to FCN are required.
C         If IOPT=1, then NJEV is set to zero.
C
C      IPVT is an integer output array of length N. IPVT defines a
C         permutation matrix P such that JAC*P = Q*R, where JAC is the
C         final calculated Jacobian, Q is orthogonal (not stored), and R
C         is upper triangular with diagonal elements of nonincreasing
C         magnitude. Column J of P is column IPVT(J) of the identity
C         matrix.
C
C      QTF is an output array of length N which contains the first N
C         elements of the vector (Q transpose)*FVEC.
C
C      WA1, WA2, and WA3 are work arrays of length N.
C
C      WA4 is a work array of length M.
C
C
C 4. Successful Completion.
C
C      The accuracy of SNLS1 is controlled by the convergence parame-
C      ters FTOL, XTOL, and GTOL. These parameters are used in tests
C      which make three types of comparisons between the approximation
C      X and a solution XSOL. SNLS1 terminates when any of the tests
C      is satisfied. If any of the convergence parameters is less than
C      the machine precision (as defined by the function R1MACH(4)),
C      then SNLS1 only attempts to satisfy the test defined by the
```

```
C           machine precision.  Further progress is not usually possible.
C
C           The tests assume that the functions are reasonably well behaved,
C           and, if the Jacobian is supplied by the user, that the functions
C           and the Jacobian are coded consistently.  If these conditions
C           are not satisfied, then SNLS1 may incorrectly indicate conver-
C           gence.  If the Jacobian is coded correctly or IOPT=1,
C           then the validity of the answer can be checked, for example, by
C           rerunning SNLS1 with tighter tolerances.
C
C           First Convergence Test.  If ENORM(Z) denotes the Euclidean norm
C              of a vector Z, then this test attempts to guarantee that
C
C                    ENORM(FVEC) .LE. (1+FTOL)*ENORM(FVECS),
C
C              where FVECS denotes the functions evaluated at XSOL.  If this
C              condition is satisfied with FTOL = 10**(-K), then the final
C              residual norm ENORM(FVEC) has K significant decimal digits and
C              INFO is set to 1 (or to 3 if the second test is also satis-
C              fied).  Unless high precision solutions are required, the
C              recommended value for FTOL is the square root of the machine
C              precision.
C
C           Second Convergence Test.  If D is the diagonal matrix whose
C              entries are defined by the array DIAG, then this test attempts
C              to guarantee that
C
C                    ENORM(D*(X-XSOL)) .LE. XTOL*ENORM(D*XSOL).
C
C              If this condition is satisfied with XTOL = 10**(-K), then the
C              larger components of D*X have K significant decimal digits and
C              INFO is set to 2 (or to 3 if the first test is also satis-
C              fied).  There is a danger that the smaller components of D*X
C              may have large relative errors, but if MODE = 1, then the
C              accuracy of the components of X is usually related to their
C              sensitivity.  Unless high precision solutions are required,
C              the recommended value for XTOL is the square root of the
C              machine precision.
C
C           Third Convergence Test.  This test is satisfied when the cosine
C              of the angle between FVEC and any column of the Jacobian at X
C              is at most GTOL in absolute value.  There is no clear rela-
C              tionship between this test and the accuracy of SNLS1, and
C              furthermore, the test is equally well satisfied at other crit-
C              ical points, namely maximizers and saddle points.  Therefore,
C              termination caused by this test (INFO = 4) should be examined
C              carefully.  The recommended value for GTOL is zero.
C
C
C      5. Unsuccessful Completion.
C
C           Unsuccessful termination of SNLS1 can be due to improper input
C           parameters, arithmetic interrupts, or an excessive number of
C           function evaluations.
C
C           Improper Input Parameters.  INFO is set to 0 if IOPT .LT. 1
C              or IOPT .GT. 3, or N .LE. 0, or M .LT. N, or for IOPT=1 or 2
```

```
C            LDFJAC .LT. M, or for IOPT=3 LDFJAC .LT. N, or FTOL .LT. 0.E0,
C            or XTOL .LT. 0.E0, or GTOL .LT. 0.E0, or MAXFEV .LE. 0, or
C            FACTOR .LE. 0.E0.
C
C         Arithmetic Interrupts. If these interrupts occur in the FCN
C            subroutine during an early stage of the computation, they may
C            be caused by an unacceptable choice of X by SNLS1. In this
C            case, it may be possible to remedy the situation by rerunning
C            SNLS1 with a smaller value of FACTOR.
C
C         Excessive Number of Function Evaluations. A reasonable value
C            for MAXFEV is 100*(N+1) for IOPT=2 or 3 and 200*(N+1) for
C            IOPT=1. If the number of calls to FCN reaches MAXFEV, then
C            this indicates that the routine is converging very slowly
C            as measured by the progress of FVEC, and INFO is set to 5.
C            In this case, it may be helpful to restart SNLS1 with MODE
C            set to 1.
C
C
C 6. Characteristics of the Algorithm.
C
C         SNLS1 is a modification of the Levenberg-Marquardt algorithm.
C         Two of its main characteristics involve the proper use of
C         implicitly scaled variables (if MODE = 1) and an optimal choice
C         for the correction. The use of implicitly scaled variables
C         achieves scale invariance of SNLS1 and limits the size of the
C         correction in any direction where the functions are changing
C         rapidly. The optimal choice of the correction guarantees (under
C         reasonable conditions) global convergence from starting points
C         far from the solution and a fast rate of convergence for
C         problems with small residuals.
C
C         Timing. The time required by SNLS1 to solve a given problem
C            depends on M and N, the behavior of the functions, the accu-
C            racy requested, and the starting point. The number of arith-
C            metic operations needed by SNLS1 is about N**3 to process each
C            evaluation of the functions (call to FCN) and to process each
C            evaluation of the Jacobian it takes M*N**2 for IOPT=2 (one
C            call to FCN), M*N**2 for IOPT=1 (N calls to FCN) and
C            1.5*M*N**2 for IOPT=3 (M calls to FCN). Unless FCN
C            can be evaluated quickly, the timing of SNLS1 will be
C            strongly influenced by the time spent in FCN.
C
C         Storage. SNLS1 requires (M*N + 2*M + 6*N) for IOPT=1 or 2 and
C            (N**2 + 2*M + 6*N) for IOPT=3 single precision storage
C            locations and N integer storage locations, in addition to
C            the storage required by the program. There are no internally
C***REFERENCES  MORE, JORGE J.
C                 THE LEVENBERG-MARQUARDT ALGORITHM, IMPLEMENTATION AND
C                 THEORY. NUMERICAL ANALYSIS, G. A. WATSON, EDITOR.
C                 LECTURE NOTES IN MATHEMATICS 630, SPRINGER-VERLAG,
C                 1977.
C***ROUTINES CALLED  CHKDER,ENORM,FDJAC3,LMPAR,QRFAC,R1MACH,RWUPDT,
C                    XERROR,XERRWV
C***END PROLOGUE  SNLS1
```

*The following code is for the eccentric tool.*

```fortran
      PROGRAM BHC_SIM_TRZ_ECCE

C THIS PROGRAM BOREHOLE CORRECTS A SIMULATED ECCENTRIC TOOL LOG.

C WRITTEN BY J. W. MILES
C            DECEMBER, 1987

C THIS IS A DRIVER FOR THE SUBROUTINE BORCOR.  IT READS A LOG FILE THAT
C                  AND WRITES A BOREHOLE CORRECTED FILE OUT IN THE
C SAME FORMAT.  SINCE THE BOREHOLE CORRECTION LAGS THE LOG BY 17
C SAMPLES, THE DRIVER DUPLICATES THE LAST LOG POINT 17 MORE TIMES TO
C MAKE THE CORRECTED LOG THE SAME LENGTH AND DEPTH AS THE ORIGINAL.

INTEGER NCHAN, IZDELAY
      PARAMETER (NCHAN=18)
      PARAMETER (IZDELAY=17)
      INTEGER IFRST, LIF, I, J, NPNTS, ISFOR
      REAL SIGMUD, RADHOL, STNDFF, SIGFOR, ZNUM, ZMIN, ZSTEP
      REAL RNUM, RMIN, RSTEP, DEPTH, DUMMY
      CHARACTER*12 IFILE
      CHARACTER*64 HEADER
      COMPLEX VIN(NCHAN), VOUT(NCHAN), VLAST(NCHAN)

PRINT *, 'ENTER FILENAME ROOT'
      READ(5, 501) LIF, IFILE
501   FORMAT(Q, A)
C THE INPUT FILES
      OPEN(12, FILE=IFILE(1:LIF)//'.RAS', STATUS='OLD', READONLY)
      OPEN(13, FILE=IFILE(1:LIF)//'.XAS', STATUS='OLD', READONLY)
C THE OUTPUT FILES
      OPEN(14, FILE=IFILE(1:LIF)//'.RBC', STATUS='NEW')
      OPEN(15, FILE=IFILE(1:LIF)//'.XBC', STATUS='NEW')
      OPEN(19, FILE='SIGEFF.DAT', STATUS='NEW')
C THE BOREHOLE PARAMETERS
      PRINT *, 'ENTER SIGMUD, RADHOL AND STNDFF'
      READ *, SIGMUD, RADHOL, STNDFF
C INITIAL GUESS FOR SIGFOR
      SIGFOR = 0.1
C GET THE HEADERS FOR THE INPUT FILES (THEY ARE ASSUMED THE SAME FOR
C BOTH THE R AND X FILES).
      READ(12, 1201) HEADER
      READ(12, 1202) ZNUM, ZMIN, ZSTEP
      READ(12, 1202) RNUM, RMIN, RSTEP
      READ(13, 1201) HEADER
      READ(13, 1202) ZNUM, ZMIN, ZSTEP
      READ(13, 1202) RNUM, RMIN, RSTEP
      HEADER = 'BHC '//HEADER
C WRITE THE HEADERS TO THE OUTPUT FILES
      WRITE(14, 1201) HEADER
      WRITE(14, 1202) ZNUM, ZMIN, ZSTEP
      WRITE(14, 1202) RNUM, RMIN, RSTEP
      WRITE(15, 1201) HEADER
      WRITE(15, 1202) ZNUM, ZMIN, ZSTEP
      WRITE(15, 1202) RNUM, RMIN, RSTEP
```

```
1201  FORMAT(1X, A64)
1202  FORMAT(1P3E16.7)

IFRST = 1
      ISFOR = 0
C THIS LOOP READS THE FIRST IZDELAY LINES AND PROCESSES THEM WITHOUT
C WRITING THE OUTPUT, BECAUSE THE BOREHOLE CORRECTION HAS A DELAY OF
C IZDELAY. ON THE FIRST ITERATION, IFRST IS 1 TO MAKE BORCOR DO
C INITIALIZATIONS. THEN IT IS CHANGED TO 0.
      DO I = 1, IZDELAY
         CALL READLN(VIN)
         CALL BORCOR(VIN, VOUT, IFRST, ISFOR,
     *               SIGMUD, SIGFOR, RADHOL, STNDFF)
         IF (I .EQ. 1) THEN
            IFRST = 0
C TIMRB INITIALIZES TIMING ROUTINE PARAMETERS.
            CALL TIMRB
         END IF
      END DO
C THE NUMBER OF POINTS WAS RECORDED IN THE HEADER OF THE INPUT FILE.
      NPNTS = NINT(ZNUM)
C KEEP TRACK OF DEPTH FOR PURPOSES OF SIGEFF OUTPUT FILE. THE 21 INCH
C OFFSET ACCOUNTS FOR THE DISTANCE BETWEEN THE 54" ARRAY TO THE
C TRANSMITTER, TO PUT SIGEFF ON DEPTH.
      DEPTH = ZMIN+21.
C OUTPUT BEGINS HERE AND CONTINUES TO THE SECOND TO LAST POINT
C OF THE INPUT FILE.
      DO I = 1, NPNTS - (IZDELAY + 1)
         CALL READLN(VIN)
         CALL BORCOR(VIN, VOUT, IFRST, ISFOR,
     *               SIGMUD, SIGFOR, RADHOL, STNDFF)
         WRITE(19, 1901) DEPTH, SIGFOR
         DEPTH = DEPTH + ZSTEP
1901     FORMAT(1X, 1P4E16.7)
         CALL WRITELN(VOUT)
      END DO
C THE LAST POINT OF THE INPUT FILE.
      CALL READLN(VIN)
C SAVE THE LAST POINT
      DO J = 1, NCHAN
         VLAST(J) = VIN(J)
      END DO
C CONTINUE OUTPUT TO MAKE THE LENGTH OF THE OUTPUT LOG THE SAME AS THE
C INPUT LOG. THE INPUT IN THIS CASE IS THE LAST POINT FROM THE INPUT
C FILE.
      DO I = 1, IZDELAY + 1
         CALL BORCOR(VIN, VOUT, IFRST, ISFOR,
     *               SIGMUD, SIGFOR, RADHOL, STNDFF)
         WRITE(19, 1901) DEPTH, SIGFOR
         DEPTH = DEPTH + ZSTEP
         CALL WRITELN(VOUT)
         DO J = 1, NCHAN
            VIN(J) = VLAST(J)
         END DO
      END DO
C TIMRE OUTPUTS THE TIMING STATS SINCE THE LAST CALL OF TIMRB.
      CALL TIMRE
```

```
C   CHECK TO MAKE SURE THERE ISN'T ANY MORE DATA AT THE END OF THE INPUT
C   FILE.
      READ(12, 1202, ERR=1001) DUMMY
      PRINT *, 'THERE IS EXTRA DATA AT THE END OF THIS FILE'
1001  CONTINUE
      CLOSE(12)
      CLOSE(13)
      CLOSE(14)
      CLOSE(15)
      CLOSE(19)

STOP
      END

SUBROUTINE BORCOR(VIN, VOUT, IFRST, ISFOR,
     *                  XSIGM, XSIGF, XRAD, XSTND)

IMPLICIT COMPLEX (C)
      INTEGER I06SHFT, I09SHFT, I12SHFT, I15SHFT
      INTEGER I21SHFT, I27SHFT, I39SHFT, I54SHFT, I72SHFT
      INTEGER NCHAN, N, M, IZDELAY, ISFOR
      PARAMETER (I06SHFT =  9)
      PARAMETER (I09SHFT =  7)
      PARAMETER (I12SHFT = 10)
      PARAMETER (I15SHFT =  6)
      PARAMETER (I21SHFT = 10)
      PARAMETER (I27SHFT =  5)
      PARAMETER (I39SHFT = 12)
      PARAMETER (I54SHFT =  1)
      PARAMETER (I72SHFT = 18)
      PARAMETER (NCHAN=18)
      PARAMETER (N=1)
      PARAMETER (M=17)
      PARAMETER (IZDELAY=17)
      INTEGER IPVT(N), IFRST, I, INFO, IOPT
      INTEGER IPTRB, IPTR(NCHAN)
      INTEGER J, LDFJAC, MAXFEV
      INTEGER MODE, NEWRX, NFEV, NJEV, NPRINT, NUMERR
      REAL DIAG(N), FJAC(M,N), FVEC(M), QTF(N)
      REAL WA1(N), WA2(N), WA3(N), WA4(M), X(N)
      REAL ATOL, DWALL, EPSFCN, FACTOR, FTOL, GTOL, RADHOL
      REAL SIGMUD, STNDFF, XTOL
      REAL XSIGM, XSIGF, XRAD, XSTND
      COMPLEX VMAT(NCHAN, IZDELAY+1), VIN(NCHAN), VOUT(NCHAN)
      COMPLEX VMEAS(NCHAN)
      COMPLEX VDM06D, VDM06E, VDM09D, VDM09E, VDM12C, VDM12D
      COMPLEX VDM15C, VDM15D, VDM21B, VDM21C, VDM27B, VDM27C
      COMPLEX VDM39B, VDM39C, VDM54B, VDM54C, VDM72B, VDM72C
      EXTERNAL FCN
      COMMON / MEAS / VMEAS
      COMMON / MUD / SIGMUD
      COMMON / WALL / DWALL
      COMMON / RXFLAG / NEWRX
      SAVE DIAG, VMAT, ATOL, /WALL/, EPSFCN, FACTOR, FTOL
      SAVE GTOL, IOPT, IPTRB, LDFJAC, MAXFEV, MODE, NPRINT
      SAVE XTOL
```

```
C   THE BOREHOLE PARAMETER SIGMUD IS PUT INTO A COMMON BLOCK FOR ACCESS
C.  BY THE SUBROUTINE FCN.
        SIGMUD = XSIGM
        IF (IFRST .EQ. 1) THEN
C   DO INITIALIZATIONS
C   SET POINTER TO LAST ROW OF BUFFER VMAT
            IPTRB = IZDELAY + 1
C   INITIALIZE BUFFER MATRIX BY DUPLICATING THE FIRST LINE OF INPUT TO
C   FILL THE MATRIX
            DO J = 1, IZDELAY + 1
              DO I = 1, NCHAN
                VMAT(I, J) = VIN(I)
              END DO
            END DO

IOPT = 1
            LDFJAC = M
            FTOL = SQRT(R1MACH(4))
            XTOL = 1.E-3
            ATOL = 5.E-3
            GTOL = 0.
            MAXFEV = 100
            EPSFCN = 1.E-4
            DIAG(1) = 0.
            MODE = 1
            FACTOR = 100.
            DWALL = 1.E6
            NPRINT = 0
            CALL XSETF(1)
            RADHOL = XRAD
            STNDFF = XSTND
            CALL DRXEVAL(RADHOL, STNDFF, NUMERR)
            NEWRX = 1
        ELSE
C   PUT INPUT INTO BUFFER MATRIX
            DO I = 1, NCHAN
                VMAT(I, IPTRB) = VIN(I)
            END DO
C   DECREMENT POINTER
            IPTRB = MOD(IPTRB + IZDELAY - 1, IZDELAY + 1) + 1
        END IF

C   CALCULATE THE DEPTH ADJUSTMENT POINTERS FOR THE INDIVIDUAL ARRAYS.
        IPTR( 1) = MOD(IPTRB + IZDELAY + 1 - I06SHFT, IZDELAY + 1) + 1
        IPTR( 2) = IPTR( 1)
        IPTR( 3) = MOD(IPTRB + IZDELAY + 1 - I09SHFT, IZDELAY + 1) + 1
        IPTR( 4) = IPTR( 3)
        IPTR( 5) = MOD(IPTRB + IZDELAY + 1 - I12SHFT, IZDELAY + 1) + 1
        IPTR( 6) = IPTR( 5)
        IPTR( 7) = MOD(IPTRB + IZDELAY + 1 - I15SHFT, IZDELAY + 1) + 1
        IPTR( 8) = IPTR( 7)
        IPTR( 9) = MOD(IPTRB + IZDELAY + 1 - I21SHFT, IZDELAY + 1) + 1
        IPTR(10) = IPTR( 9)
        IPTR(11) = MOD(IPTRB + IZDELAY + 1 - I27SHFT, IZDELAY + 1) + 1
        IPTR(12) = IPTR(11)
        IPTR(13) = MOD(IPTRB + IZDELAY + 1 - I39SHFT, IZDELAY + 1) + 1
        IPTR(14) = IPTR(13)
```

```
      IPTR(15) = MOD(IPTRB + IZDELAY + 1 - I54SHFT, IZDELAY + 1) + 1
      IPTR(16) = IPTR(15)
      IPTR(17) = MOD(IPTRB + IZDELAY + 1 - I72SHFT, IZDELAY + 1) + 1
      IPTR(18) = IPTR(17)
C     THE FOLLOWING VALUES ARE DEPTH CORRELATED FOR THE CORRECTION
      DO 705 I = 1, NCHAN
         VMEAS(I) = VMAT(I, IPTR(I))
705   CONTINUE

X(1) = XSIGF

C     EVALUATE TERMS IN RADHOL, SIGMUD, AND SIGFOR FOR POLYNOMIALS
      IF (((XRAD-RADHOL).GT.1.E-6).OR.((XSTND-STNDFF).GT.1.E-6)) THEN
         NEWRX = 1
         RADHOL = XRAD
         STNDFF = XSTND
         CALL DRXEVAL(RADHOL, STNDFF, NUMERR)
      ENDIF
      IF (NUMERR .EQ. 101) THEN
         PRINT *, 'ERROR 101: TOOL DECENTRATION .LT. 0'
      ENDIF
      IF (NUMERR .EQ. 102) THEN
         PRINT *, 'ERROR 102: BOREHOLE RADIUS .LE. 0'
      ENDIF
      IF (ISFOR.EQ.1) THEN
         CALL DSMFEVAL(SIGMUD, XSIGF, NUMERR)
         IF (NUMERR .EQ. 103) THEN
            PRINT *, 'ERROR 103: BOREHOLE CONDUCTIVITY .LT. 0'
         ENDIF
C     MAKE CORRECTION ON THE FIRST FEW CHANNELS.  THIS IS NECESSARY TO
C     ENSURE THAT THE POLYNOMIAL FUNCTIONS GET CALLED WITH THE PROPER NEWRX
C     FLAG, SINCE SNLS1, AND THUS FCN, IS NOT CALLED.
         VMAT( 1, IPTR(1)) = VMEAS( 1) - VDM06D(NEWRX)
         VMAT( 2, IPTR(2)) = VMEAS( 2) - VDM06E(NEWRX)
         VMAT( 3, IPTR(3)) = VMEAS( 3) - VDM09D(NEWRX)
         VMAT( 4, IPTR(4)) = VMEAS( 4) - VDM09E(NEWRX)
         VMAT( 5, IPTR(5)) = VMEAS( 5) - VDM12C(NEWRX)
         VMAT( 6, IPTR(6)) = VMEAS( 6) - VDM12D(NEWRX)
         VMAT( 7, IPTR(7)) = VMEAS( 7) - VDM15C(NEWRX)
         VMAT( 8, IPTR(8)) = VMEAS( 8) - VDM15D(NEWRX)
      ELSE
C     NONLINEAR LEAST SQUARES SOLVER, FINDS OPTIMUM SIGFOR BY MINIMIZING
C     THE SUM OF SQUARES OF THE ERRORS BETWEEN THE MEASURED AND PREDICTED
C     VALUES.
         CALL SNLS1(FCN, IOPT, M, N, X, FVEC, FJAC, LDFJAC,
     *      FTOL, XTOL, GTOL, MAXFEV, EPSFCN, DIAG, MODE, FACTOR,
     *      NPRINT, INFO, NFEV, NJEV, IPVT, QTF, WA1, WA2, WA3, WA4, ATOL)
C     REMEMBER SIGFOR FOR INITIAL GUESS NEXT TIME 'ROUND
         XSIGF = X(1)
C     MAKE CORRECTION ON THE FIRST FEW CHANNELS.  HERE SNLS1 IS CALLED,
C     WHICH CALLS FCN, WHICH CALLS THESE FUNCTIONS WITH THE PROPER FLAG.
C     THEREFORE WE DO NOT HAVE TO REEVALUATE R AND X TERMS, SINCE THEY ARE
C     GUARANTEED TO HAVE BEEN EVALUATED IN THE CALLS BY FCN.
         VMAT( 1, IPTR(1)) = VMEAS( 1) - VDM06D(0)
         VMAT( 2, IPTR(2)) = VMEAS( 2) - VDM06E(0)
         VMAT( 3, IPTR(3)) = VMEAS( 3) - VDM09D(0)
```

```fortran
      VMAT( 4, IPTR(4)) = VMEAS( 4) - VDM09E(0)
      VMAT( 5, IPTR(5)) = VMEAS( 5) - VDM12C(0)
      VMAT( 6, IPTR(6)) = VMEAS( 6) - VDM12D(0)
      VMAT( 7, IPTR(7)) = VMEAS( 7) - VDM15C(0)
      VMAT( 8, IPTR(8)) = VMEAS( 8) - VDM15D(0)
C     IF (INFO.EQ.0) THEN
C        PRINT *, 'IMPROPER INPUT PARAMETERS'
C     ELSE IF (INFO.EQ.1) THEN
C        PRINT *, 'BOTH ACTUAL AND PREDICTED RELATIVE REDUCTIONS IN'
C        PRINT *, 'THE SUM OF SQUARES ARE AT MOST FTOL'
C     ELSE IF (INFO.EQ.2) THEN
C        PRINT *, 'RELATIVE ERROR BETWEEN TWO CONSECUTIVE ITERATES'
C        PRINT *, 'IS AT MOST XTOL'
C     ELSE IF (INFO.EQ.3) THEN
C        PRINT *, 'CONDITIONS FOR INFO = 1 AND INFO = 2 BOTH HOLD'
C     ELSE IF (INFO.EQ.4) THEN
C        PRINT *, 'THE COSINE OF THE ANGLE BETWEEN FVEC AND ANY'
C        PRINT *, 'COLUMN OF THE JACOBIAN IS AT MOST GTOL IN ABSOLUTE
C        PRINT *, 'VALUE'
C     ELSE IF (INFO.EQ.5) THEN
C        PRINT *, 'NUMBER OF CALLS TO FCN FOR FUNCTION EVALUATION'
C        PRINT *, 'HAS REACHED MAXFEV'
C     ELSE IF (INFO.EQ.6) THEN
C        PRINT *, 'FTOL IS TOO SMALL.  NO FURTHER REDUCTION IN THE'
C        PRINT *, 'SUM OF SQUARES IS POSSIBLE'
C     ELSE IF (INFO.EQ.7) THEN
C        PRINT *, 'XTOL IS TOO SMALL.  NO FURTHER IMPROVEMENT IN'
C        PRINT *, 'THE APPROXIMATE SOLUTION X IS POSSIBLE'
C     ELSE IF (INFO.EQ.8) THEN
C        PRINT *, 'GTOL IS TOO SMALL.  FVEC IS ORTHOGONAL TO THE'
C        PRINT *, 'COLUMNS OF THE JACOBIAN TO MACHINE PRECISION'
C     ENDIF
      ENDIF C MAKE CORRECTION ON THE REST OF THE CHANNELS
      IF (IFRST .EQ. 1) NEWRX = 1
      VMAT( 9, IPTR( 9)) = VMEAS( 9) - VDM21B(NEWRX)
      VMAT(10, IPTR(10)) = VMEAS(10) - VDM21C(NEWRX)
      VMAT(11, IPTR(11)) = VMEAS(11) - VDM27B(NEWRX)
      VMAT(12, IPTR(12)) = VMEAS(12) - VDM27C(NEWRX)
      VMAT(13, IPTR(13)) = VMEAS(13) - VDM39B(NEWRX)
      VMAT(14, IPTR(14)) = VMEAS(14) - VDM39C(NEWRX)
      VMAT(15, IPTR(15)) = VMEAS(15) - VDM54B(NEWRX)
      VMAT(16, IPTR(16)) = VMEAS(16) - VDM54C(NEWRX)
      VMAT(17, IPTR(17)) = VMEAS(17) - VDM72B(NEWRX)
      VMAT(18, IPTR(18)) = VMEAS(18) - VDM72C(NEWRX)

C PUT OUTPUT IN I/O ARRAY
      DO I = 1, NCHAN
         VOUT(I) = VMAT(I, IPTRB)
      END DO
      RETURN
      END
```

```
      SUBROUTINE FCN(IFLAG, M, N, X, FVEC, DUM, IDUM)

INTEGER NCHAN
      PARAMETER (NCHAN=18)
      INTEGER I, IDUM, IFLAG, M, N, NEWRX, NSCHAN, NUMERR
      REAL FVEC(M), X(N), DUM, DWALL
      REAL SIGFOR, SIGMUD, SSQ
      COMPLEX VEPS(NCHAN), VHOM(NCHAN), VMEAS(NCHAN), VMILES(NCHAN)
      COMPLEX VDM06D, VDM06E, VDM09D, VDM09E
      COMPLEX VDM12C, VDM12D, VDM15C, VDM15D
      COMMON / MEAS / VMEAS
      COMMON / MUD / SIGMUD
      COMMON / WALL / DWALL
      COMMON / RXFLAG / NEWRX

SIGFOR = X(1)
      NSCHAN = (M - 1)/2

C CALCULATE HOMOGENEOUS MEDIUM VALUES
      DO 704 I = 1, NSCHAN
         CALL HERMIT(I,SIGFOR,VHOM(I))
704   CONTINUE

CALL DSMFEVAL(SIGMUD, SIGFOR, NUMERR)
      IF (NUMERR .EQ. 103) THEN
         PRINT *, 'ERROR 103: BOREHOLE CONDUCTIVITY .LT. 0'
      ENDIF

C CALCULATE PREDICTED VALUES
      VMILES(1) = VHOM(1) + VDM06D(NEWRX)
      VMILES(2) = VHOM(2) + VDM06E(NEWRX)
      VMILES(3) = VHOM(3) + VDM09D(NEWRX)
      VMILES(4) = VHOM(4) + VDM09E(NEWRX)
      VMILES(5) = VHOM(5) + VDM12C(NEWRX)
      VMILES(6) = VHOM(6) + VDM12D(NEWRX)
      VMILES(7) = VHOM(7) + VDM15C(NEWRX)
      VMILES(8) = VHOM(8) + VDM15D(NEWRX)
C ALL RADIUS AND STANDOFF TERMS HAVE BEEN CALCULATED, SO NEWRX MAY BE
C SET TO 0.
      NEWRX = 0
C CALCULATE WEIGHTS
      DO 705 I = 1, NSCHAN
         VEPS(I) = CMPLX((0.01*ABS( REAL(VMEAS(I)))+0.001),
     *                   (0.03*ABS(AIMAG(VMEAS(I)))+0.003))
705   CONTINUE

IF (IFLAG.EQ.0) THEN
C CALCULATE SUM OF SQUARES
         SSQ = 0.
         DO 706 I = 1, NSCHAN
            SSQ = SSQ + ( REAL(VMEAS(I) - VMILES(I)))**2/ REAL(VEPS(I))
            SSQ = SSQ + (AIMAG(VMEAS(I) - VMILES(I)))**2/AIMAG(VEPS(I))
```

```
706     CONTINUE
        IF (X(1).LT.0.) THEN
           SSQ = SSQ + (DWALL*SINH(X(1)))**2
        ENDIF
        WRITE(6, 601) X, SSQ
601     FORMAT(1X, 'ITERATE = ', 1P1E16.7, ' SUM OF SQUARES = ',
     *      1P1E16.7)
      ELSE
C CALCULATE ERRORS BETWEEN PREDICTED AND MEASURED VALUES
      DO 707 I = 1, NSCHAN
         FVEC(2*I-1)=( REAL(VMEAS(I)-VMILES(I)))/SQRT( REAL(VEPS(I)))
         FVEC(2*I  )=(AIMAG(VMEAS(I)-VMILES(I)))/SQRT(AIMAG(VEPS(I)))
707   CONTINUE
      IF (X(1).GE.0.) THEN
         FVEC(M) = 0.
      ELSE
         FVEC(M) = -DWALL*SINH(X(1))
      ENDIF
    ENDIF

RETURN
    END subroutine dsmfeval(sigmud, sigfor, numerr)

real sigmud, sigfor
    common / smfterms / sigdif, dif2, rat, rat2, rat3, rat4, sm,
   * sm2, sm3, sf, sfsm, sfsm2, sfrat, sfrat2, sfrat3, sfrat4,
   * xlsf, xlsfrat, xlsfrat2, xlsfrat3, xlsfrat4, rsf, rsf3, rsfrat,
   * rsfrat2, rsfrat3, rsfrat4, rsfsm, rsfsm2, rsfdif2, sfdif2,
   * xlsmlsf2, xlsmlsf2rat2 if (sigmud.lt.0.) then
       numerr = 103
       return
    endif sigdif = sigmud - sigfor
    dif2 = sigdif*sigdif
    sigrat = sigdif/(sigmud + sigfor)
    rat = sigdif*sigrat
    rat2 = rat*sigrat
    rat3 = rat2*sigrat
    rat4 = rat3*sigrat
    sm = sigdif*sigmud
    sm2 = sm*sigmud
    sm3 = sm2*sigmud
    sf = sigdif*sigfor
    sfsm = sf*sigmud
    sfsm2 = sfsm*sigmud
    sfrat = sf*sigrat
    sfrat2 = sfrat*sigrat
    sfrat3 = sfrat2*sigrat
    sfrat4 = sfrat3*sigrat
    xlsigfor = log10(abs(sigfor)+1.e-10)
    xlsf = sigdif*xlsigfor
    xlsfrat = xlsf*sigrat
    xlsfrat2 = xlsfrat*sigrat
```

```
xlsfrat3 = xlsfrat2*sigrat
xlsfrat4 = xlsfrat3*sigrat
rsf = sigdif*sqrt(abs(sigfor))
rsf3 = rsf*sigfor
rsfrat = rsf*sigrat
rsfrat2 = rsfrat*sigrat
rsfrat3 = rsfrat2*sigrat
rsfrat4 = rsfrat3*sigrat
rsfsm = rsf*sigmud
rsfsm2 = rsfsm*sigmud
rsfdif2 = rsf*sigdif
sfdif2 = sf*sigdif
xlsmlsf2 = log10(abs(sigmud)+1.e-10)*xlsigfor**2*sigdif
xlsmlsf2rat2 = xlsmlsf2*sigrat**2 return
end subroutine drxeval(radhol, stndff, numerr)

real radhol, stndff
common / rxterms / r, r2, r3, r4, r5, x, x2, x3, x4, rx,
*   rx2, rx3, rx4, r2x, r2x2, r2x3, r2x4, r3x, r3x2, r3x3,
*   r4x, r4x2, r5x, rinv, sqrtr, sqrtx, sqrtrx decent = radhol - stndff - 1.8125
if (decent.lt.0.) then
   numerr = 101
   return
endif
if (radhol.le.0.) then
   numerr = 102
   return
endif r = radhol
r2 = radhol*r
r3 = radhol*r2
r4 = radhol*r3
r5 = radhol*r4
x = stndff
x2 = stndff*x
x3 = stndff*x2
x4 = stndff*x3
rx = r*x
rx2 = r*x2
rx3 = r*x3
rx4 = r*x4
r2x = r2*x
r2x2 = r2*x2
r2x3 = r2*x3
r2x4 = r2*x4
r3x = r3*x
r3x2 = r3*x2
r3x3 = r3*x3
r4x = r4*x
r4x2 = r4*x2
```

```
r5x = r5*x
rinv = 1./radhol
sqrtr = sqrt(radhol)
sqrtx = sqrt(stndff)
sqrtrx = sqrtr*sqrtx return
end
```

*The following is the correction polynomial function for M06D. It is given as an example; the other 17 functions are omitted.*

```
complex function vdm06d(newrx)

real coeffr(252), coeffx(99), Ar(21), Br(12), Cr(12)
real Ax(11), Bx(9), Cx(9)
common / rxterms / r, r2, r3, r4, r5, x, x2, x3, x4, rx,
*    rx2, rx3, rx4, r2x, r2x2, r2x3, r2x4, r3x, r3x2, r3x3,
*    r4x, r4x2, r5x, rinv, sqrtr, sqrtx, sqrtrx
common / smfterms / sigdif, dif2, rat, rat2, rat3, rat4, sm,
*    sm2, sm3, sf, sfsm, sfsm2, sfrat, sfrat2, sfrat3, sfrat4,
*    xlsf, xlsfrat, xlsfrat2, xlsfrat3, xlsfrat4, rsf, rsf3, rsfrat,
*    rsfrat2, rsfrat3, rsfrat4, rsfsm, rsfsm2, rsfdif2, sfdif2,
*    xlsmlsf2, xlsmlsf2rat2
save Br, Bx data coeffr(  1) /   -6.5068656E-01 /
data coeffr(  2) /    3.7510177E-01 /
data coeffr(  3) /    1.2870504E+00 /
data coeffr(  4) /   -2.0648436E-01 /
data coeffr(  5) /   -1.1786315E+00 /
data coeffr(  6) /   -3.5266415E-04 /
data coeffr(  7) /    3.8190816E-02 /
data coeffr(  8) /    2.4227211E-02 /
data coeffr(  9) /   -1.1220354E-03 /
data coeffr( 10) /   -3.9229399E-01 /
data coeffr( 11) /    4.8184190E-02 /
data coeffr( 12) /    3.8680083E-01 /
data coeffr( 13) /    2.2063375E-01 /
data coeffr( 14) /   -1.3436402E-01 /
data coeffr( 15) /   -3.0386052E-01 /
data coeffr( 16) /    2.3533607E-02 /
data coeffr( 17) /    2.4457051E-01 /
data coeffr( 18) /    1.1353503E-04 /
data coeffr( 19) /   -7.8289965E-03 /
data coeffr( 20) /   -4.3338840E-03 /
data coeffr( 21) /    2.0688531E-04 /
data coeffr( 22) /    8.7521292E-02 /
data coeffr( 23) /   -1.3166280E-02 /
data coeffr( 24) /   -8.6884007E-02 /
data coeffr( 25) /   -1.5807789E-02 /
data coeffr( 26) /    9.2513943E-03 /
data coeffr( 27) /    2.3325054E-02 /
data coeffr( 28) /   -9.4898941E-04 /
data coeffr( 29) /   -1.8137390E-02 /
data coeffr( 30) /   -1.0313886E-05 /
```

```
      data coeffr( 31) /     5.3650030E-04 /
      data coeffr( 32) /     3.1292546E-04 /
      data coeffr( 33) /    -1.5321402E-05 /
      data coeffr( 34) /    -6.6449400E-03 /
      data coeffr( 35) /     1.0863038E-03 /
      data coeffr( 36) /     6.7131007E-03 /
      data coeffr( 37) /     3.1524800E-05 /
      data coeffr( 38) /    -1.7437216E-05 /
      data coeffr( 39) /    -4.7975926E-05 /
      data coeffr( 40) /     6.7237045E-07 /
      data coeffr( 41) /     3.6409150E-05 /
      data coeffr( 42) /     2.0253262E-08 /
      data coeffr( 43) /    -1.0839836E-06 /
      data coeffr( 44) /    -6.1224142E-07 /
      data coeffr( 45) /     3.0638798E-08 /
      data coeffr( 46) /     1.3738998E-05 /
      data coeffr( 47) /    -2.5639540E-06 /
      data coeffr( 48) /    -1.4086210E-05 /
      data coeffr( 49) /    -2.6655987E-01 /
      data coeffr( 50) /    -1.6524738E-01 /
      data coeffr( 51) /     7.6393777E-01 /
      data coeffr( 52) /    -2.5242096E-01 /
      data coeffr( 53) /    -8.7605691E-01 /
      data coeffr( 54) /     9.7364245E-05 /
      data coeffr( 55) /     2.9665273E-02 /
      data coeffr( 56) /     2.4620838E-02 /
      data coeffr( 57) /    -1.0991538E-03 /
      data coeffr( 58) /    -2.4443804E-01 /
      data coeffr( 59) /     6.8364399E-03 /
      data coeffr( 60) /     2.3729435E-01 /
      data coeffr( 61) /    -2.0164078E-02 /
      data coeffr( 62) /    -5.0624371E-02 /
      data coeffr( 63) /     9.8392315E-02 /
      data coeffr( 64) /     5.3173199E-02 /
      data coeffr( 65) /    -3.4089383E-02 /
      data coeffr( 66) /    -3.6876669E-04 /
      data coeffr( 67) /    -5.4100086E-04 /
      data coeffr( 68) /    -4.6715820E-03 /
      data coeffr( 69) /     1.7669276E-04 /
      data coeffr( 70) /    -4.3832794E-02 /
      data coeffr( 71) /     2.6911542E-02 /
      data coeffr( 72) /     5.1599901E-02 /
      data coeffr( 73) /    -7.2529139E-03 /
      data coeffr( 74) /     4.4921534E-03 /
      data coeffr( 75) /     8.0090892E-03 /
      data coeffr( 76) /    -6.1597195E-03 /
      data coeffr( 77) /    -1.1063418E-02 /
      data coeffr( 78) /     2.9246861E-05 /
      data coeffr( 79) /     5.6357356E-04 /
      data coeffr( 80) /     7.4272038E-04 /
      data coeffr( 81) /    -3.1436837E-05 /
      data coeffr( 82) /    -1.1229248E-03 /
      data coeffr( 83) /    -1.7443051E-03 /
      data coeffr( 84) /     3.0246939E-04 /
      data coeffr( 85) /     2.3907363E-01 /
      data coeffr( 86) /     1.2387907E-01 /
```

```
data coeffr( 87) /   -6.7702872E-01 /
data coeffr( 88) /    1.7105263E-01 /
data coeffr( 89) /    7.2419429E-01 /
data coeffr( 90) /   -1.4652128E-04 /
data coeffr( 91) /   -2.5626898E-02 /
data coeffr( 92) /   -2.1608667E-02 /
data coeffr( 93) /    9.5493812E-04 /
data coeffr( 94) /    2.0955768E-01 /
data coeffr( 95) /   -2.4817949E-03 /
data coeffr( 96) /   -2.0120139E-01 /
data coeffr( 97) /   -3.3549152E-02 /
data coeffr( 98) /    3.5344131E-02 /
data coeffr( 99) /    1.4420780E-02 /
data coeffr(100) /   -5.7927851E-02 /
data coeffr(101) /   -6.2038321E-02 /
data coeffr(102) /    3.1693300E-04 /
data coeffr(103) /    3.7393128E-03 /
data coeffr(104) /    6.5137274E-03 /
data coeffr(105) /   -2.6573776E-04 /
data coeffr(106) /    8.2766060E-03 /
data coeffr(107) /   -2.1133732E-02 /
data coeffr(108) /   -1.5513071E-02 /
data coeffr(109) /    1.8779133E-02 /
data coeffr(110) /   -1.0852983E-02 /
data coeffr(111) /   -2.6402883E-02 /
data coeffr(112) /    1.6696969E-02 /
data coeffr(113) /    3.4600448E-02 /
data coeffr(114) /   -7.0637332E-05 /
data coeffr(115) /   -1.5992859E-03 /
data coeffr(116) /   -2.0228326E-03 /
data coeffr(117) /    8.5691630E-05 /
data coeffr(118) /    4.7408673E-03 /
data coeffr(119) /    4.2311582E-03 /
data coeffr(120) /   -2.8297901E-03 /
data coeffr(121) /   -6.0692903E-02 /
data coeffr(122) /   -3.1196404E-02 /
data coeffr(123) /    2.2914077E-01 /
data coeffr(124) /   -4.2525232E-02 /
data coeffr(125) /   -2.2800125E-01 /
data coeffr(126) /   -2.9020914E-05 /
data coeffr(127) /    7.6344912E-03 /
data coeffr(128) /    5.6118988E-03 /
data coeffr(129) /   -2.5311692E-04 /
data coeffr(130) /   -7.2251342E-02 /
data coeffr(131) /    6.1267042E-03 /
data coeffr(132) /    7.1213499E-02 /
data coeffr(133) /    6.3117924E-03 /
data coeffr(134) /   -5.3696041E-03 /
data coeffr(135) /   -1.2485245E-02 /
data coeffr(136) /    9.9954670E-03 /
data coeffr(137) /    1.8581307E-02 /
data coeffr(138) /   -3.7987036E-05 /
data coeffr(139) /   -7.9464319E-04 /
data coeffr(140) /   -1.0669734E-03 /
data coeffr(141) /    4.5041899E-05 /
data coeffr(142) /    1.9488432E-03 /
data coeffr(143) /    2.3624578E-03 /
```

```
data coeffr(144) /   -1.1024714E-03 /
data coeffr(145) /   -3.1581488E-03 /
data coeffr(146) /    1.7364511E-03 /
data coeffr(147) /    7.1395040E-03 /
data coeffr(148) /   -3.1213302E-03 /
data coeffr(149) /   -8.2227392E-03 /
data coeffr(150) /    7.8070434E-06 /
data coeffr(151) /    3.1772716E-04 /
data coeffr(152) /    3.3637416E-04 /
data coeffr(153) /   -1.4712813E-05 /
data coeffr(154) /   -1.7059337E-03 /
data coeffr(155) /   -3.9068877E-04 /
data coeffr(156) /    1.4819694E-03 /
data coeffr(157) /    6.7543187E-05 /
data coeffr(158) /   -2.8971725E-05 /
data coeffr(159) /   -3.3137962E-04 /
data coeffr(160) /    1.1256351E-04 /
data coeffr(161) /    3.4946424E-04 /
data coeffr(162) /    1.2027127E-07 /
data coeffr(163) /   -1.0589449E-05 /
data coeffr(164) /   -6.4846695E-06 /
data coeffr(165) /    3.3403967E-07 /
data coeffr(166) /    1.0135897E-04 /
data coeffr(167) /   -1.6865361E-05 /
data coeffr(168) /   -1.0120870E-04 /
data coeffr(169) /    7.2873887E-03 /
data coeffr(170) /    4.3403292E-03 /
data coeffr(171) /   -3.3164691E-02 /
data coeffr(172) /    4.9980292E-03 /
data coeffr(173) /    3.1879559E-02 /
data coeffr(174) /    9.3120680E-06 /
data coeffr(175) /   -1.0367953E-03 /
data coeffr(176) /   -6.9415761E-04 /
data coeffr(177) /    3.1593532E-05 /
data coeffr(178) /    1.0633567E-02 /
data coeffr(179) /   -1.2580054E-03 /
data coeffr(180) /   -1.0596900E-02 /
data coeffr(181) /   -2.9025611E-04 /
data coeffr(182) /    2.3421686E-04 /
data coeffr(183) /    6.7244732E-04 /
data coeffr(184) /   -4.1285055E-04 /
data coeffr(185) /   -9.0088614E-04 /
data coeffr(186) /    1.5206639E-06 /
data coeffr(187) /    3.6840225E-05 /
data coeffr(188) /    4.8240432E-05 /
data coeffr(189) /   -2.0313626E-06 /
data coeffr(190) /   -1.1776100E-04 /
data coeffr(191) /   -9.7840282E-05 /
data coeffr(192) /    8.6499007E-05 /
data coeffr(193) /    1.3207286E-04 /
data coeffr(194) /   -7.3046263E-05 /
data coeffr(195) /   -2.9933953E-04 /
data coeffr(196) /    1.1590057E-04 /
data coeffr(197) /    3.3541085E-04 /
data coeffr(198) /   -3.2175848E-07 /
data coeffr(199) /   -1.2950962E-05 /
data coeffr(200) /   -1.4143572E-05 /
```

```
data coeffr(201)  /    6.0990436E-07 /
data coeffr(202)  /    6.9550930E-05 /
data coeffr(203)  /    1.7609198E-05 /
data coeffr(204)  /   -6.1293977E-05 /
data coeffr(205)  /   -4.1518049E-04 /
data coeffr(206)  /   -3.1049576E-04 /
data coeffr(207)  /    2.2686075E-03 /
data coeffr(208)  /   -3.1111646E-04 /
data coeffr(209)  /   -2.1548895E-03 /
data coeffr(210)  /   -8.0265556E-07 /
data coeffr(211)  /    6.8755275E-05 /
data coeffr(212)  /    4.3447377E-05 /
data coeffr(213)  /   -1.9865420E-06 /
data coeffr(214)  /   -7.3661708E-04 /
data coeffr(215)  /    9.8911143E-05 /
data coeffr(216)  /    7.3757698E-04 /
data coeffr(217)  /    8.8434235E-06 /
data coeffr(218)  /    8.9018731E-06 /
data coeffr(219)  /   -6.0187365E-05 /
data coeffr(220)  /    8.2325896E-06 /
data coeffr(221)  /    5.7335354E-05 /
data coeffr(222)  /    2.2421103E-08 /
data coeffr(223)  /   -1.8088267E-06 /
data coeffr(224)  /   -1.1238754E-06 /
data coeffr(225)  /    5.1317006E-08 /
data coeffr(226)  /    1.9669924E-05 /
data coeffr(227)  /   -2.7084898E-06 /
data coeffr(228)  /   -1.9727378E-05 /
data coeffr(229)  /    5.6388563E-01 /
data coeffr(230)  /   -2.8497839E-01 /
data coeffr(231)  /   -1.5296379E+00 /
data coeffr(232)  /    2.9739136E-01 /
data coeffr(233)  /    1.4891704E+00 /
data coeffr(234)  /    4.2053518E-05 /
data coeffr(235)  /   -5.0839622E-02 /
data coeffr(236)  /   -3.7326273E-02 /
data coeffr(237)  /    1.6721240E-03 /
data coeffr(238)  /    4.7225508E-01 /
data coeffr(239)  /   -3.3543233E-02 /
data coeffr(240)  /   -4.5633012E-01 /
data coeffr(241)  /   -8.9140385E-03 /
data coeffr(242)  /    2.1216674E-02 /
data coeffr(243)  /   -1.6998841E-01 /
data coeffr(244)  /    7.7706568E-02 /
data coeffr(245)  /    2.1001351E-01 /
data coeffr(246)  /    3.3897761E-04 /
data coeffr(247)  /   -4.0250029E-03 /
data coeffr(248)  /    5.2631625E-05 /
data coeffr(249)  /    3.5840880E-05 /
data coeffr(250)  /    6.9252729E-02 /
data coeffr(251)  /   -2.5179438E-02 /
data coeffr(252)  /   -7.6865427E-02 / data coeffx(  1)  /   -2.3905712E-03 /
data coeffx(  2)  /    1.6431425E-03 /
data coeffx(  3)  /    1.5336229E-04 /
data coeffx(  4)  /   -2.1684270E-03 /
```

```
data coeffx(  5) /   7.2201277E-05 /
data coeffx(  6) /   1.7436964E-03 /
data coeffx(  7) /   8.5758616E-04 /
data coeffx(  8) /   2.8566632E-04 /
data coeffx(  9) /  -7.8238001E-05 /
data coeffx( 10) /   2.0998036E-03 /
data coeffx( 11) /  -1.6385351E-03 /
data coeffx( 12) /  -1.0370287E-04 /
data coeffx( 13) /   1.2215170E-03 /
data coeffx( 14) /  -4.0914772E-05 /
data coeffx( 15) /  -1.8960192E-03 /
data coeffx( 16) /  -4.7847227E-04 /
data coeffx( 17) /   5.2689540E-04 /
data coeffx( 18) /   5.2682899E-05 /
data coeffx( 19) /  -5.0306047E-04 /
data coeffx( 20) /   4.6358074E-04 /
data coeffx( 21) /   1.2728955E-05 /
data coeffx( 22) /  -7.5264419E-05 /
data coeffx( 23) /   3.6699374E-05 /
data coeffx( 24) /   6.3392357E-04 /
data coeffx( 25) /   1.3615184E-05 /
data coeffx( 26) /  -4.6505811E-04 /
data coeffx( 27) /  -5.7637612E-06 /
data coeffx( 28) /   1.6664417E-05 /
data coeffx( 29) /  -1.6533209E-05 /
data coeffx( 30) /  -2.1296303E-07 /
data coeffx( 31) /  -1.1767493E-06 /
data coeffx( 32) /  -3.3740903E-07 /
data coeffx( 33) /  -1.9101732E-05 /
data coeffx( 34) /  -2.6846347E-09 /
data coeffx( 35) /   1.8669156E-05 /
data coeffx( 36) /   4.3744258E-08 /
data coeffx( 37) /  -1.8581705E-03 /
data coeffx( 38) /   1.9137936E-03 /
data coeffx( 39) /  -3.4929614E-04 /
data coeffx( 40) /  -1.0543523E-03 /
data coeffx( 41) /   4.5063036E-05 /
data coeffx( 42) /   1.2656857E-03 /
data coeffx( 43) /  -5.1131643E-05 /
data coeffx( 44) /  -1.4515796E-03 /
data coeffx( 45) /  -4.5995883E-05 /
data coeffx( 46) /   1.4916525E-04 /
data coeffx( 47) /  -1.3882481E-04 /
data coeffx( 48) /  -1.5848558E-04 /
data coeffx( 49) /  -1.2404002E-05 /
data coeffx( 50) /   1.5418773E-05 /
data coeffx( 51) /   6.0553426E-05 /
data coeffx( 52) /   1.3582259E-04 /
data coeffx( 53) /  -1.8999419E-04 /
data coeffx( 54) /   1.2600339E-05 /
data coeffx( 55) /   5.3959998E-04 /
data coeffx( 56) /  -7.3278847E-04 /
data coeffx( 57) /   2.2777633E-04 /
data coeffx( 58) /   3.9725023E-04 /
data coeffx( 59) /  -6.3544554E-05 /
data coeffx( 60) /  -5.0104910E-04 /
data coeffx( 61) /   1.4011272E-04 /
```

```
      data coeffx( 62) /      1.1622797E-03 /
      data coeffx( 63) /      4.7418657E-06 /
      data coeffx( 64) /     -3.5800254E-05 /
      data coeffx( 65) /      7.7887285E-05 /
      data coeffx( 66) /      2.3532621E-05 /
      data coeffx( 67) /     -2.3513562E-06 /
      data coeffx( 68) /      3.1870707E-06 /
      data coeffx( 69) /     -1.5453999E-05 /
      data coeffx( 70) /     -9.0070440E-05 /
      data coeffx( 71) /     -1.0120990E-04 /
      data coeffx( 72) /     -2.5715756E-06 /
      data coeffx( 73) /     -3.8279341E-05 /
      data coeffx( 74) /      5.0323237E-05 /
      data coeffx( 75) /     -1.3571950E-05 /
      data coeffx( 76) /     -3.1346750E-05 /
      data coeffx( 77) /      1.8265175E-05 /
      data coeffx( 78) /      6.4698746E-05 /
      data coeffx( 79) /      1.4734188E-06 /
      data coeffx( 80) /     -1.0405819E-04 /
      data coeffx( 81) /      7.3483898E-07 /
      data coeffx( 82) /      1.6451182E-07 /
      data coeffx( 83) /     -1.1842280E-06 /
      data coeffx( 84) /     -3.6186796E-07 /
      data coeffx( 85) /     -5.1242927E-07 /
      data coeffx( 86) /      1.9659774E-07 /
      data coeffx( 87) /      8.3222460E-07 /
      data coeffx( 88) /      1.9335271E-06 /
      data coeffx( 89) /      1.8363305E-06 /
      data coeffx( 90) /      5.1670785E-08 /
      data coeffx( 91) /      9.9870334E-08 /
      data coeffx( 92) /     -5.1448321E-08 /
      data coeffx( 93) /      8.3664226E-08 /
      data coeffx( 94) /      3.4304932E-07 /
      data coeffx( 95) /     -3.0478469E-07 /
      data coeffx( 96) /     -5.6085918E-07 /
      data coeffx( 97) /     -1.4144857E-07 /
      data coeffx( 98) /      6.8446388E-07 /
      data coeffx( 99) /     -2.3717417E-08 / if (newrx .eq. 1) then
         Ar( 1) = 1.
         Ar( 2) = r
         Ar( 3) = r2
         Ar( 4) = r4
         Ar( 5) = x
         Ar( 6) = x2
         Ar( 7) = x4
         Ar( 8) = rx
         Ar( 9) = rx2
         Ar(10) = rx3
         Ar(11) = r2x
         Ar(12) = r2x2
         Ar(13) = r2x3
         Ar(14) = r2x4
         Ar(15) = r3x
         Ar(16) = r3x2
         Ar(17) = r3x3
```

```fortran
      Ar(18) = r4x
      Ar(19) = r5x
      Ar(20) = rinv
      Ar(21) = sqrtx do I = 1, 12
        sum = 0.
        do J = 1, 21
          sum = sum + coeffr(I + (J - 1)*12)*Ar(J)
        end do
        Br(I) = sum
      end do
end if Cr( 1) = sigdif
Cr( 2) = rat
Cr( 3) = rat2
Cr( 4) = rat3
Cr( 5) = rat4
Cr( 6) = sm
Cr( 7) = sf
Cr( 8) = sfrat
Cr( 9) = sfsm
Cr(10) = rsfrat2
Cr(11) = rsfrat3
Cr(12) = rsfrat4
sumr = 0.
do I = 1, 12
   sumr = sumr + Br(I)*Cr(I)
end do if (newrx .eq. 1) then
   Ax( 1) = 1.
   Ax( 2) = r
   Ax( 3) = r2
   Ax( 4) = r3
   Ax( 5) = x
   Ax( 6) = x2
   Ax( 7) = rx
   Ax( 8) = rx2
   Ax( 9) = r2x
   Ax(10) = r2x3
   Ax(11) = r3x2 do I = 1, 9
     sum = 0.
     do J = 1, 11
       sum = sum + coeffx(I + (J - 1)*9)*Ax(J)
     end do
     Bx(I) = sum
   end do
end if Cx( 1) = sigdif
Cx( 2) = rat2
Cx( 3) = dif2
Cx( 4) = sf
```

```
      Cx( 5) = sfrat2
      Cx( 6) = rsf
      Cx( 7) = rsfrat
      Cx( 8) = rsfrat2
      Cx( 9) = rsfdif2 sumx = 0.
      do I = 1, 9
         sumx = sumx + Bx(I)*Cx(I)
      end do vdm06d = cmplx(sumr, sumx)

return
      end
```

*The following code is for the centered tool.*

```
      PROGRAM BHC_SIM_TRZ_CENT

C  THIS PROGRAM BOREHOLE CORRECTS A SIMULATED CENTERED TOOL LOG.

C
C  WRITTEN BY J. W. MILES
C           DECEMBER, 1987
C
C  THIS IS A DRIVER FOR THE SUBROUTINE BORCOR.  IT READS A LOG FILE THAT
C                         WRITES A BOREHOLE CORRECTED FILE OUT IN THE
C  SAME FORMAT.  SINCE THE BOREHOLE CORRECTION LAGS THE LOG BY 17
C  SAMPLES, THE DRIVER DUPLICATES THE LAST LOG POINT 17 MORE TIMES TO
C  MAKE THE CORRECTED LOG THE SAME LENGTH AND DEPTH AS THE ORIGINAL.

INTEGER NCHAN, IZDELAY
      PARAMETER (NCHAN=18)
      PARAMETER (IZDELAY=17)
      INTEGER IFRST, LIF, I, J, NPNTS, ISFOR
      REAL SIGMUD, RADHOL, SIGFOR, ZNUM, ZMIN, ZSTEP
      REAL RNUM, RMIN, RSTEP, DEPTH, DUMMY
      CHARACTER*64 IFILE, HEADER
      COMPLEX VIN(NCHAN), VOUT(NCHAN), VLAST(NCHAN)

PRINT *, 'ENTER FILENAME ROOT'
      READ(5, 501) LIF, IFILE
501   FORMAT(Q, A)
C  THE INPUT FILES
      OPEN(12, FILE=IFILE(1:LIF)//'.RAS', STATUS='OLD', READONLY)
      OPEN(13, FILE=IFILE(1:LIF)//'.XAS', STATUS='OLD', READONLY)
C  THE OUTPUT FILES
      OPEN(14, FILE=IFILE(1:LIF)//'.RBC', STATUS='NEW')
      OPEN(15, FILE=IFILE(1:LIF)//'.XBC', STATUS='NEW')
      OPEN(19, FILE='SIGEFF.DAT', STATUS='NEW')
C  THE BOREHOLE PARAMETERS
      PRINT *, 'ENTER SIGMUD AND RADHOL'
      READ *, SIGMUD, RADHOL
C  INITIAL GUESS FOR SIGFOR
      SIGFOR = 0.1
```

```
C  GET THE HEADERS FOR THE INPUT FILES (THEY ARE ASSUMED THE SAME FOR
C  BOTH THE R AND X FILES).
      READ(12, 1201) HEADER
      READ(12, 1202) ZNUM, ZMIN, ZSTEP
      READ(12, 1202) RNUM, RMIN, RSTEP
      READ(13, 1201) HEADER
      READ(13, 1202) ZNUM, ZMIN, ZSTEP
      READ(13, 1202) RNUM, RMIN, RSTEP
      HEADER = 'BHC '//HEADER
C  WRITE THE HEADERS TO THE OUTPUT FILES
      WRITE(14, 1201) HEADER
      WRITE(14, 1202) ZNUM, ZMIN, ZSTEP
      WRITE(14, 1202) RNUM, RMIN, RSTEP
      WRITE(15, 1201) HEADER
      WRITE(15, 1202) ZNUM, ZMIN, ZSTEP
      WRITE(15, 1202) RNUM, RMIN, RSTEP
1201  FORMAT(1X, A64)
1202  FORMAT(1P3E16.7)

IFRST = 1
      ISFOR = 0
C  THIS LOOP READS THE FIRST IZDELAY LINES AND PROCESSES THEM WITHOUT
C  WRITING THE OUTPUT, BECAUSE THE BOREHOLE CORRECTION HAS A DELAY OF
C  IZDELAY.  ON THE FIRST ITERATION, IFRST IS 1 TO MAKE BORCOR DO
C  INITIALIZATIONS.  THEN IT IS CHANGED TO 0.
      DO I = 1, IZDELAY
         CALL READLN(VIN)
         CALL BORCOR(VIN, VOUT, IFRST, ISFOR,
     *               SIGMUD, SIGFOR, RADHOL)
         IF (I .EQ. 1) THEN
            IFRST = 0
C  TIMRB INITIALIZES TIMING ROUTINE PARAMETERS.
            CALL TIMRB
         END IF
      END DO
C  THE NUMBER OF POINTS WAS RECORDED IN THE HEADER OF THE INPUT FILE.
      NPNTS = NINT(ZNUM)
C  KEEP TRACK OF DEPTH FOR PURPOSES OF SIGEFF OUTPUT FILE.  THE 21 INCH
C  OFFSET ACCOUNTS FOR THE DISTANCE BETWEEN THE 54" ARRAY TO THE
C  TRANSMITTER, TO PUT SIGEFF ON DEPTH.
      DEPTH = ZMIN+21.
C  OUTPUT BEGINS HERE AND CONTINUES TO THE SECOND TO LAST POINT
C  OF THE INPUT FILE.
      DO I = 1, NPNTS - (IZDELAY + 1)
         CALL READLN(VIN)
         CALL BORCOR(VIN, VOUT, IFRST, ISFOR,
     *               SIGMUD, SIGFOR, RADHOL)
         WRITE(19, 1901) DEPTH, SIGFOR
         DEPTH = DEPTH + ZSTEP
1901     FORMAT(1X, 1P4E16.7)
         CALL WRITELN(VOUT)
      END DO
C  THE LAST POINT OF THE INPUT FILE.
      CALL READLN(VIN)
```

```
C SAVE THE LAST POINT
      DO J = 1, NCHAN
         VLAST(J) = VIN(J)
      END DO
C CONTINUE OUTPUT TO MAKE THE LENGTH OF THE OUTPUT LOG THE SAME AS THE
C INPUT LOG.  THE INPUT IN THIS CASE IS THE LAST POINT FROM THE INPUT
C FILE.
      DO I = 1, IZDELAY + 1
         CALL BORCOR(VIN, VOUT, IFRST, ISFOR,
     *               SIGMUD, SIGFOR, RADHOL)
         WRITE(19, 1901) DEPTH, SIGFOR
         DEPTH = DEPTH + ZSTEP
         CALL WRITELN(VOUT)
         DO J = 1, NCHAN
            VIN(J) = VLAST(J)
         END DO
      END DO
C TIMRE OUTPUTS THE TIMING STATS SINCE THE LAST CALL OF TIMRB.
      CALL TIMRE

C CHECK TO MAKE SURE THERE ISN'T ANY MORE DATA AT THE END OF THE INPUT
C FILE.
      READ(12, 1202, ERR=1001) DUMMY
      PRINT *, 'THERE IS EXTRA DATA AT THE END OF THIS FILE'
1001  CONTINUE
      CLOSE(12)
      CLOSE(13)
      CLOSE(14)
      CLOSE(15)
      CLOSE(19)

STOP
      END
      SUBROUTINE BORCOR(VIN, VOUT, IFRST, ISFOR,
     *                  XSIGM, XSIGF, XRAD)

IMPLICIT COMPLEX (C)
      INTEGER I06SHFT, I09SHFT, I12SHFT, I15SHFT
      INTEGER I21SHFT, I27SHFT, I39SHFT, I54SHFT, I72SHFT
      INTEGER NCHAN, N, M, IZDELAY, ISFOR
      PARAMETER (I06SHFT =  9)
      PARAMETER (I09SHFT =  7)
      PARAMETER (I12SHFT = 10)
      PARAMETER (I15SHFT =  6)
      PARAMETER (I21SHFT = 10)
      PARAMETER (I27SHFT =  5)
      PARAMETER (I39SHFT = 12)
      PARAMETER (I54SHFT =  1)
      PARAMETER (I72SHFT = 18)
      PARAMETER (NCHAN=18)
      PARAMETER (N=1)
      PARAMETER (M=17)
      PARAMETER (IZDELAY=17)
      INTEGER IPVT(N), IFRST, I, INFO, IOPT
      INTEGER IPTRB, IPTR(NCHAN)
      INTEGER J, LDFJAC, MAXFEV
      INTEGER MODE, NEWR, NFEV, NJEV, NPRINT, NUMERR
```

```
      REAL DIAG(N), FJAC(M,N), FVEC(M), QTF(N)
      REAL WA1(N), WA2(N), WA3(N), WA4(M), X(N)
      REAL ATOL, DWALL, EPSFCN, FACTOR, FTOL, GTOL, RADHOL
      REAL SIGMUD, XTOL
      REAL XSIGM, XSIGF, XRAD
      COMPLEX VMAT(NCHAN, IZDELAY+1), VIN(NCHAN), VOUT(NCHAN)
      COMPLEX VMEAS(NCHAN)
      COMPLEX VCM06D, VCM06E, VCM09D, VCM09E, VCM12C, VCM12D
      COMPLEX VCM15C, VCM15D, VCM21B, VCM21C, VCM27B, VCM27C
      COMPLEX VCM39B, VCM39C, VCM54B, VCM54C, VCM72B, VCM72C
      EXTERNAL FCN
      COMMON / MEAS / VMEAS
      COMMON / MUD / SIGMUD
      COMMON / WALL / DWALL
      COMMON / RFLAG / NEWR
      SAVE DIAG, VMAT, ATOL, /WALL/, EPSFCN, FACTOR, FTOL
      SAVE GTOL, IOPT, IPTRB, LDFJAC, MAXFEV, MODE, NPRINT
      SAVE XTOL

C   THE BOREHOLE PARAMETER SIGMUD IS PUT INTO A COMMON BLOCK FOR ACCESS
C   BY THE SUBROUTINE FCN.
      SIGMUD = XSIGM
      IF (IFRST .EQ. 1) THEN
C   DO INITIALIZATIONS
C   SET POINTER TO LAST ROW OF BUFFER VMAT
         IPTRB = IZDELAY + 1
C   INITIALIZE BUFFER MATRIX BY DUPLICATING THE FIRST LINE OF INPUT TO
C   FILL THE MATRIX
         DO J = 1, IZDELAY + 1
            DO I = 1, NCHAN
               VMAT(I, J) = VIN(I)
            END DO
         END DO

IOPT = 1
         LDFJAC = M
         FTOL = SQRT(R1MACH(4))
         XTOL = 1.E-3
         ATOL = 5.E-3
         GTOL = 0.
         MAXFEV = 100
         EPSFCN = 1.E-4
         DIAG(1) = 0.
         MODE = 1
         FACTOR = 100.
         DWALL = 1.E6
         NPRINT = 0
         CALL XSETF(1)
         RADHOL = XRAD
         CALL CREVAL(RADHOL, NUMERR)
         NEWR = 1
      ELSE
C   PUT INPUT INTO BUFFER MATRIX
         DO I = 1, NCHAN
            VMAT(I, IPTRB) = VIN(I)
         END DO
```

```
C DECREMENT POINTER
      IPTRB = MOD(IPTRB + IZDELAY - 1, IZDELAY + 1) + 1
      END IF

C CALCULATE THE DEPTH ADJUSTMENT POINTERS FOR THE INDIVIDUAL ARRAYS.
      IPTR( 1) = MOD(IPTRB + IZDELAY + 1 - I06SHFT, IZDELAY + 1) + 1
      IPTR( 2) = IPTR( 1)
      IPTR( 3) = MOD(IPTRB + IZDELAY + 1 - I09SHFT, IZDELAY + 1) + 1
      IPTR( 4) = IPTR( 3)
      IPTR( 5) = MOD(IPTRB + IZDELAY + 1 - I12SHFT, IZDELAY + 1) + 1
      IPTR( 6) = IPTR( 5)
      IPTR( 7) = MOD(IPTRB + IZDELAY + 1 - I15SHFT, IZDELAY + 1) + 1
      IPTR( 8) = IPTR( 7)
      IPTR( 9) = MOD(IPTRB + IZDELAY + 1 - I21SHFT, IZDELAY + 1) + 1
      IPTR(10) = IPTR( 9)
      IPTR(11) = MOD(IPTRB + IZDELAY + 1 - I27SHFT, IZDELAY + 1) + 1
      IPTR(12) = IPTR(11)
      IPTR(13) = MOD(IPTRB + IZDELAY + 1 - I39SHFT, IZDELAY + 1) + 1
      IPTR(14) = IPTR(13)
      IPTR(15) = MOD(IPTRB + IZDELAY + 1 - I54SHFT, IZDELAY + 1) + 1
      IPTR(16) = IPTR(15)
      IPTR(17) = MOD(IPTRB + IZDELAY + 1 - I72SHFT, IZDELAY + 1) + 1
      IPTR(18) = IPTR(17)
C THE FOLLOWING VALUES ARE DEPTH CORRELATED FOR THE CORRECTION
      DO 705 I = 1, NCHAN
         VMEAS(I) = VMAT(I, IPTR(I))
705   CONTINUE

X(1) = XSIGF

C EVALUATE TERMS IN RADHOL, SIGMUD, AND SIGFOR FOR POLYNOMIALS
      IF ((XRAD-RADHOL).GT.1.E-6) THEN
         NEWR = 1
         RADHOL = XRAD
         CALL CREVAL(RADHOL, NUMERR)
      ENDIF
      IF (NUMERR .EQ. 102) THEN
         PRINT *, 'ERROR 102:  BOREHOLE RADIUS .LE. 0'
      ENDIF
      IF (ISFOR.EQ.1) THEN
         CALL CSMFEVAL(SIGMUD, XSIGF, NUMERR)
         IF (NUMERR .EQ. 103) THEN
            PRINT *, 'ERROR 103: BOREHOLE CONDUCTIVITY .LT. 0'
         ENDIF
C MAKE CORRECTION ON THE FIRST FEW CHANNELS.  THIS IS NECESSARY TO
C ENSURE THAT THE POLYNOMIAL FUNCTIONS GET CALLED WITH THE PROPER NEWR
C FLAG, SINCE SNLS1, AND THUS FCN, IS NOT CALLED.
         VMAT( 1, IPTR(1)) = VMEAS( 1) - VCM06D(NEWR)
         VMAT( 2, IPTR(2)) = VMEAS( 2) - VCM06E(NEWR)
         VMAT( 3, IPTR(3)) = VMEAS( 3) - VCM09D(NEWR)
         VMAT( 4, IPTR(4)) = VMEAS( 4) - VCM09E(NEWR)
         VMAT( 5, IPTR(5)) = VMEAS( 5) - VCM12C(NEWR)
         VMAT( 6, IPTR(6)) = VMEAS( 6) - VCM12D(NEWR)
         VMAT( 7, IPTR(7)) = VMEAS( 7) - VCM15C(NEWR)
         VMAT( 8, IPTR(8)) = VMEAS( 8) - VCM15D(NEWR)
      ELSE
```

```
C     NONLINEAR LEAST SQUARES SOLVER, FINDS OPTIMUM SIGFOR BY MINIMIZING
C     THE SUM OF SQUARES OF THE ERRORS BETWEEN THE MEASURED AND PREDICTED
C     VALUES.
          CALL SNLS1(FCN, IOPT, M, N, X, FVEC, FJAC, LDFJAC,
     *      FTOL, XTOL, GTOL, MAXFEV, EPSFCN, DIAG, MODE, FACTOR,
     *      NPRINT, INFO, NFEV, NJEV, IPVT, QTF, WA1, WA2, WA3, WA4, ATOL)
C     REMEMBER SIGFOR FOR INITIAL GUESS NEXT TIME 'ROUND
          XSIGF = X(1)
C     MAKE CORRECTION ON THE FIRST FEW CHANNELS.  HERE SNLS1 IS CALLED,
C     WHICH CALLS FCN, WHICH CALLS THESE FUNCTIONS WITH THE PROPER FLAG.
C     THEREFORE WE DO NOT HAVE TO REEVALUATE R AND X TERMS, SINCE THEY ARE
C     GUARANTEED TO HAVE BEEN EVALUATED IN THE CALLS BY FCN.
          VMAT( 1, IPTR(1)) = VMEAS( 1) - VCM06D(0)
          VMAT( 2, IPTR(2)) = VMEAS( 2) - VCM06E(0)
          VMAT( 3, IPTR(3)) = VMEAS( 3) - VCM09D(0)
          VMAT( 4, IPTR(4)) = VMEAS( 4) - VCM09E(0)
          VMAT( 5, IPTR(5)) = VMEAS( 5) - VCM12C(0)
          VMAT( 6, IPTR(6)) = VMEAS( 6) - VCM12D(0)
          VMAT( 7, IPTR(7)) = VMEAS( 7) - VCM15C(0)
          VMAT( 8, IPTR(8)) = VMEAS( 8) - VCM15D(0)
C         IF (INFO.EQ.0) THEN
C             PRINT *, 'IMPROPER INPUT PARAMETERS'
C         ELSE IF (INFO.EQ.1) THEN
C             PRINT *, 'BOTH ACTUAL AND PREDICTED RELATIVE REDUCTIONS IN'
C             PRINT *, 'THE SUM OF SQUARES ARE AT MOST FTOL'
C         ELSE IF (INFO.EQ.2) THEN
C             PRINT *, 'RELATIVE ERROR BETWEEN TWO CONSECUTIVE ITERATES'
C             PRINT *, 'IS AT MOST XTOL'
C         ELSE IF (INFO.EQ.3) THEN
C             PRINT *, 'CONDITIONS FOR INFO = 1 AND INFO = 2 BOTH HOLD'
C         ELSE IF (INFO.EQ.4) THEN
C             PRINT *, 'THE COSINE OF THE ANGLE BETWEEN FVEC AND ANY'
C             PRINT *, 'COLUMN OF THE JACOBIAN IS AT MOST GTOL IN ABSOLUTE'
C             PRINT *, 'VALUE'
C         ELSE IF (INFO.EQ.5) THEN
C             PRINT *, 'NUMBER OF CALLS TO FCN FOR FUNCTION EVALUATION'
C             PRINT *, 'HAS REACHED MAXFEV'
C         ELSE IF (INFO.EQ.6) THEN
C             PRINT *, 'FTOL IS TOO SMALL.  NO FURTHER REDUCTION IN THE'
C             PRINT *, 'SUM OF SQUARES IS POSSIBLE'
C         ELSE IF (INFO.EQ.7) THEN
C             PRINT *, 'XTOL IS TOO SMALL.  NO FURTHER IMPROVEMENT IN'
C             PRINT *, 'THE APPROXIMATE SOLUTION X IS POSSIBLE'
C         ELSE IF (INFO.EQ.8) THEN
C             PRINT *, 'GTOL IS TOO SMALL.  FVEC IS ORTHOGONAL TO THE'
C             PRINT *, 'COLUMNS OF THE JACOBIAN TO MACHINE PRECISION'
C         ENDIF
      ENDIF

C     MAKE CORRECTION ON THE REST OF THE CHANNELS
      IF (IFRST .EQ. 1) NEWR = 1
          VMAT( 9, IPTR( 9)) = VMEAS( 9) - VCM21B(NEWR)
          VMAT(10, IPTR(10)) = VMEAS(10) - VCM21C(NEWR)
          VMAT(11, IPTR(11)) = VMEAS(11) - VCM27B(NEWR)
          VMAT(12, IPTR(12)) = VMEAS(12) - VCM27C(NEWR)
          VMAT(13, IPTR(13)) = VMEAS(13) - VCM39B(NEWR)
          VMAT(14, IPTR(14)) = VMEAS(14) - VCM39C(NEWR)
```

```
              VMAT(15, IPTR(15)) = VMEAS(15) - VCM54B(NEWR)
              VMAT(16, IPTR(16)) = VMEAS(16) - VCM54C(NEWR)
              VMAT(17, IPTR(17)) = VMEAS(17) - VCM72B(NEWR)
              VMAT(18, IPTR(18)) = VMEAS(18) - VCM72C(NEWR)

C PUT OUTPUT IN I/O ARRAY
              DO I = 1, NCHAN
                VOUT(I) = VMAT(I, IPTRB)
              END DO

RETURN
              END
              SUBROUTINE FCN(IFLAG, M, N, X, FVEC, DUM, IDUM)

INTEGER NCHAN
              PARAMETER (NCHAN=18)
              INTEGER I, IDUM, IFLAG, M, N, NEWR, NSCHAN, NUMERR
              REAL FVEC(M), X(N), DUM, DWALL
              REAL SIGFOR, SIGMUD, SSQ
              COMPLEX VEPS(NCHAN), VHOM(NCHAN), VMEAS(NCHAN), VMILES(NCHAN)
              COMPLEX VCM06D, VCM06E, VCM09D, VCM09E
              COMPLEX VCM12C, VCM12D, VCM15C, VCM15D
              COMMON / MEAS / VMEAS
              COMMON / MUD / SIGMUD
              COMMON / WALL / DWALL
              COMMON / RFLAG / NEWR

SIGFOR = X(1)
              NSCHAN = (M - 1)/2

C CALCULATE HOMOGENEOUS MEDIUM VALUES
              DO 704 I = 1, NSCHAN
                CALL HERMIT(I,SIGFOR,VHOM(I))
      704     CONTINUE

CALL CSMFEVAL(SIGMUD, SIGFOR, NUMERR)
              IF (NUMERR .EQ. 103) THEN
                PRINT *, 'ERROR 103: BOREHOLE CONDUCTIVITY .LT. 0'
              ENDIF

C CALCULATE PREDICTED VALUES
              VMILES(1) = VHOM(1) + VCM06D(NEWR)
              VMILES(2) = VHOM(2) + VCM06E(NEWR)
              VMILES(3) = VHOM(3) + VCM09D(NEWR)
              VMILES(4) = VHOM(4) + VCM09E(NEWR)
              VMILES(5) = VHOM(5) + VCM12C(NEWR)
              VMILES(6) = VHOM(6) + VCM12D(NEWR)
              VMILES(7) = VHOM(7) + VCM15C(NEWR)
              VMILES(8) = VHOM(8) + VCM15D(NEWR)
      C ALL RADIUS TERMS HAVE BEEN CALCULATED, SO NEWR MAY BE
      C SET TO 0.
              NEWR = 0
      C CALCULATE WEIGHTS
              DO 705 I = 1, NSCHAN
                VEPS(I) = CMPLX((0.01*ABS( REAL(VMEAS(I)))+0.001),
             *                 (0.03*ABS(AIMAG(VMEAS(I)))+0.003))
```

```fortran
705     CONTINUE

IF (IFLAG.EQ.0) THEN
C   CALCULATE SUM OF SQUARES
          SSQ = 0.
          DO 706 I = 1, NSCHAN
            SSQ = SSQ + ( REAL(VMEAS(I) - VMILES(I)))**2/ REAL(VEPS(I))
            SSQ = SSQ + (AIMAG(VMEAS(I) - VMILES(I)))**2/AIMAG(VEPS(I))
706       CONTINUE
          IF (X(1).LT.0.) THEN
            SSQ = SSQ + (DWALL*SINH(X(1)))**2
          ENDIF
          WRITE(6, 601) X, SSQ
601       FORMAT(1X, 'ITERATE = ', 1P1E16.7, ' SUM OF SQUARES = ',
     *          1P1E16.7)
        ELSE
C   CALCULATE ERRORS BETWEEN PREDICTED AND MEASURED VALUES
          DO 707 I = 1, NSCHAN
            FVEC(2*I-1)=( REAL(VMEAS(I)-VMILES(I)))/SQRT( REAL(VEPS(I)))
            FVEC(2*I  )=(AIMAG(VMEAS(I)-VMILES(I)))/SQRT(AIMAG(VEPS(I)))
707       CONTINUE
          IF (X(1).GE.0.) THEN
            FVEC(M) = 0.
          ELSE
            FVEC(M) = -DWALL*SINH(X(1))
          ENDIF
        ENDIF

RETURN
        END
        subroutine csmfeval(sigmud, sigfor, numerr)

real sigmud, sigfor
        common / x_y_z / x, ysm, ysf, yrsf, z if (sigmud.lt.0.) then
          numerr = 103
          sigmud = 0.
        endif x = (abs(sigmud) - sigfor)/22.
        ysm = sigmud/22. - 1.
        ysf = abs(sigfor)/5. - 1.
        yrsf = 2.*sqrt(abs(sigfor/10.)) - 1.

return
        end subroutine creval(radhol, numerr)

real radhol
        common / x_y_z / x, ysm, ysf, yrsf, z
```

```
if (radhol.le.0.) then
  numerr = 102
endif z = radhol/4. - 1.5 return
end
```

The following is the correction polynomial function for M06D. It is given as an example; the other 17 functions are omitted.

```
complex function vcm06d(newr)

real Ar(36), Br( 6), Cr( 2)
real Ax(32), Bx( 8), Cx( 2)
common / x_y_z / x, ysm, ysf, yrsf, z data Ar(  1) /    4.4014668E+01 /
data Ar(  2) /    1.8913338E+01 /
data Ar(  3) /   -4.2017317E+00 /
data Ar(  4) /   -7.6426631E-01 /
data Ar(  5) /    6.4285654E-01 /
data Ar(  6) /   -2.1385615E-01 /
data Ar(  7) /   -5.9535012E+00 /
data Ar(  8) /   -3.8648245E+00 /
data Ar(  9) /   -9.2101884E-01 /
data Ar( 10) /    1.3605979E-02 /
data Ar( 11) /    2.5345320E-02 /
data Ar( 12) /   -8.8728144E-04 /
data Ar( 13) /   -5.5104566E-01 /
data Ar( 14) /   -4.4796041E-01 /
data Ar( 15) /   -1.8136674E-01 /
data Ar( 16) /   -5.3988062E-03 /
data Ar( 17) /    7.8663277E-03 /
data Ar( 18) /   -2.3715483E-04 /
data Ar( 19) /    4.2721863E+00 /
data Ar( 20) /    2.5549147E+00 /
data Ar( 21) /    4.0888476E-01 /
data Ar( 22) /   -4.8380036E-02 /
data Ar( 23) /   -9.5503442E-03 /
data Ar( 24) /    5.8117433E-04 /
data Ar( 25) /    4.1552967E-01 /
data Ar( 26) /    3.2040164E-01 /
data Ar( 27) /    1.0862647E-01 /
data Ar( 28) /   -8.1762476E-03 /
data Ar( 29) /   -6.9884220E-03 /
data Ar( 30) /    3.5776201E-04 /
data Ar( 31) /   -1.5062157E-02 /
data Ar( 32) /   -1.2756310E-02 /
data Ar( 33) /   -7.4724900E-03 /
data Ar( 34) /   -2.7600252E-03 /
data Ar( 35) /   -4.5343584E-04 /
data Ar( 36) /    3.3449298E-05 /
```

```
data Ax(  1) /     4.2290168E+00 /
data Ax(  2) /     2.2576902E+00 /
data Ax(  3) /     1.1646897E-01 /
data Ax(  4) /    -6.2941834E-02 /
data Ax(  5) /     2.6485701E+00 /
data Ax(  6) /     1.3949988E+00 /
data Ax(  7) /     4.7120590E-02 /
data Ax(  8) /    -4.7045991E-02 /
data Ax(  9) /     4.9070868E-01 /
data Ax( 10) /     2.4676728E-01 /
data Ax( 11) /    -4.7050850E-03 /
data Ax( 12) /    -1.0719300E-02 /
data Ax( 13) /    -7.0281610E-02 /
data Ax( 14) /    -4.0694986E-02 /
data Ax( 15) /    -5.1496052E-03 /
data Ax( 16) /     1.0940309E-03 /
data Ax( 17) /     3.2123649E+00 /
data Ax( 18) /     2.0340078E+00 /
data Ax( 19) /     3.4112835E-01 /
data Ax( 20) /    -8.9022845E-02 /
data Ax( 21) /    -9.6721843E-02 /
data Ax( 22) /    -7.1347699E-02 /
data Ax( 23) /    -2.6540888E-02 /
data Ax( 24) /    -3.4074190E-03 /
data Ax( 25) /    -2.8062850E-02 /
data Ax( 26) /    -2.0024944E-02 /
data Ax( 27) /    -6.6879853E-03 /
data Ax( 28) /    -4.3437816E-04 /
data Ax( 29) /    -3.3348654E-03 /
data Ax( 30) /    -2.2930508E-03 /
data Ax( 31) /    -6.9977652E-04 /
data Ax( 32) /    -4.2447307E-05 / if (newr.eq.1) then
  do J = 1, 6
    Br(J) = cheby(z, Ar(6*J-5), 6)
  end do
end if do K = 1, 2
  Cr(K) = cheby(ysm, Br(3*K-2), 3)
end do vcm06d = cmplx(x*cheby(x, Cr(1), 2), 0.)

if (newr.eq.1) then
  do J = 1, 8
    Bx(J) = cheby(z, Ax(4*J-3), 4)
  end do
end if do K = 1, 2
  Cx(K) = cheby(yrsf, Bx(4*K-3), 4)
end do vcm06d = vcm06d + cmplx(0., x*cheby(x, Cx(1), 2))
return
end
```

```
    real function cheby(x, cs, n)

real cs(n)

if (n.lt.1) call xerror( 'cheby   number of terms le 0', 28,
  * 2, 2)
    if (n.gt.1000) call xerror( 'cheby   number of terms gt 1000',
  * 31, 3, 2)
    if (x.lt.-1. .or. x.gt.1.) call xerror( 'cheby   x outside
  * (-1, +1)', 26, 1, 1)

y1 = 0.
    y0 = 0.
    twox = 2.*x
    do 100 i = 1, n
      y2 = y1
      y1 = y0
      y0 = twox*y1 - y2 + cs(n + 1 - i)
100 continue cheby = 0.5*(y0 - y2)

return
    end
```

*Routines called by both the centered and decentered codes.*

```
    SUBROUTINE HERMIT(JCHINP, SIGINP, CV0HER)

IMPLICIT COMPLEX (C)
    PARAMETER (JCD = 19)
    PARAMETER (MGD = 402)
    INTEGER MGSTAB(JCD)
    REAL SIGTAB(MGD, JCD)
    COMPLEX CV0TAB(MGD, JCD), CV1TAB(MGD, JCD)
```

*21,672 data statements filling the four arrays MGSTAB, SIGTAB, CV0TAB and CV1TAB go here.*

```
    DS = SIGTAB(2, JCHINP) - SIGTAB(1, JCHINP)
    REDS = 1./DS
    MG = INT(REDS*(SIGINP - SIGTAB(1, JCHINP))) + 1
    MG = MAX0(1, MIN0(MGSTAB(JCHINP) - 1, MG))
    SIGINF = SIGTAB(MG, JCHINP)
    CV0INF = CV0TAB(MG, JCHINP)
    CV0SUP = CV0TAB(MG + 1, JCHINP)
    CV1INF = CV1TAB(MG, JCHINP)
    CV1SUP = CV1TAB(MG + 1, JCHINP)
    WTSUP1 = REDS*(SIGINP - SIGINF)
    WTINF1 = 1. - WTSUP1
    WTSUP2 = WTSUP1*WTSUP1
    WTINF2 = WTINF1*WTINF1
    W00INF = WTINF2*(1. + 2.*WTSUP1)
    W00SUP = WTSUP2*(1. + 2.*WTINF1)
    W01INF = DS*WTINF2*WTSUP1
    W01SUP = -DS*WTSUP2*WTINF1
```

```
      CV0HER = W00INF*CV0INF + W00SUP*CV0SUP +
     *         W01INF*CV1INF + W01SUP*CV1SUP

RETURN
      END
      SUBROUTINE READLN(VIN)

C THIS ROUTINE READS A ROW OF DATA FOR THE AIT FROM A FILE IN
C TEKRZ FORMAT.

INTEGER J
      REAL VIN(36)

1203  FORMAT(1P8E16.7)
      READ(12, 1203) (VIN(J), J =  1, 15, 2)
      READ(12, 1203) (VIN(J), J = 17, 31, 2)
      READ(12, 1203) VIN(33), VIN(35)
      READ(13, 1203) (VIN(J), J =  2, 16, 2)
      READ(13, 1203) (VIN(J), J = 18, 32, 2)
      READ(13, 1203) VIN(34), VIN(36)

RETURN
      END

SUBROUTINE WRITELN(VOUT)

C THIS ROUTINE WRITES A ROW OF DATA FOR THE AIT TO A FILE IN
C TEKRZ FORMAT.

INTEGER J
      REAL VOUT(36)

1203  FORMAT(1P8E16.7)
      WRITE(14, 1203) (VOUT(J), J =  1, 15, 2)
      WRITE(14, 1203) (VOUT(J), J = 17, 31, 2)
      WRITE(14, 1203) (VOUT(J), J = 33, 35, 2)
      WRITE(15, 1203) (VOUT(J), J =  2, 16, 2)
      WRITE(15, 1203) (VOUT(J), J = 18, 32, 2)
      WRITE(15, 1203) (VOUT(J), J = 34, 36, 2)

RETURN
      END
```

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An evaporator adapted to respond to voltage signal data developed by a well tool when said well tool is disposed in a borehole and to a set of fixed values of parameters of said borehole for generating a set of borehole corrected data and for recording said set of borehole corrected data on an output record medium, said borehole corrected data representing other voltage signal data that said well tool would have developed in the absence of said borehole, comprising:

receiving means for receiving said voltage signal data and a set of fixed values of said parameters of said borehole;

parameter determination means responsive to said set of fixed values of said parameters and to at least some of said voltage signal data developed by said well tool for iteratively determining a set of other values of said parameters of said borehole using a least squares minimization technique, said set of fixed values and said set of other values collectively comprising said parameters of said borehole;

final correction means responsive to said set of fixed values and to said set of other values of said parameters and to said voltage signal data for determining final model voltages as a function of both said set of fixed values and said set of other values of said parameters for each said voltage signal data, said final correction means correcting said voltage signal data using said final model voltages thereby generating said set of borehole corrected data; and recording means for recording said set of borehole corrected data generated by said final correction means on said output record medium.

2. The apparatus of claim 1, wherein said parameter determination means comprises:

solver means responsive to said set of fixed values of said parameters and to said at least some of said voltage signal data for selecting an initial set of said other values of said parameters; and intermediate correction means responsive to said fixed values and to the initial set of said other values of said parameters for computing intermediate model voltage values for each of said at least some of said voltage signal data as a function of said fixed values and the initial set of said other values of said parameters of said borehole, the solver means determining, using a least square minimization technique, a residual value E as a function of said at least some of said voltage signal data and the intermediate model voltage values and storing said residual value E.

3. The apparatus of claim 2, wherein:

the solver means selects, at each iteration of a plurality of iterations, a further set of said other values of said parameters of said borehole;

the intermediate correction means computes, at said each iteration of the plurality of iterations, further intermediate model voltage values corresponding, respectively, to said at least some of said voltage signal data, the further intermediate model voltage values being a function of said fixed values and the corresponding further set of said other values of said parameters selected by the solver means at each corresponding iteration, the solver means determines, at said each iteration of the plurality of iterations, another value of said residual value E as a function of said at least some of said voltage signal data and the further intermediate model voltage values computed by the intermediate correction means at each corresponding iteration and stores said other values of said residual value E, the solver means selects, after a final iteration of the plurality of iterations, a special set of said other values of said parameters of said borehole, the special set of said other values of said parameters being one of said other values of said parameters of said borehole which correspond to a minimum one of the residual values E stored in said solver means, the special set of said other values of said parameters representing said set of other values of said parameters of said borehole determined by said parameter determination means.

4. The apparatus of claim 3, wherein said final correction means comprises:

correction means responsive to said set of fixed values and to said set of other values of said parameters of said borehole selected by the solver means for determining said final model voltages as a function of both said set of fixed values and said set of other values of said parameters associated with each said voltage signal data; and final correction means responsive to the final model voltages determined by said correction means and to said voltage signal data developed by said well tool for subtracting said final model voltages from corresponding ones of said voltage signal data thereby generating said set of borehole corrected data, said recording means recording said set of borehole corrected data on said output record medium.

5. A well logging system including a well tool adapted to be disposed in a borehole and an apparatus adapted to be connected to the well tool, said well tool including a transmitter and at least a plurality of receivers where the receivers collectively develop voltage signal data and the well tool develops a set of fixed values of parameters of said borehole, said apparatus being adapted to respond to said voltage signal data and to said set of fixed values of said parameters of said borehole for developing borehole corrected data and for recording said borehole corrected data on an output record medium, said borehole corrected data representing other voltage signal data that would have been developed by said receivers of said well tool in the absence of said borehole, said apparatus comprising:

receiving means for receiving said voltage signal data and a set of fixed values of said parameters of said borehole from said well tool;

parameters determination means responsive to said set of fixed values of said parameters of said borehole and to at least some of said voltage signal data from said receiving means for iteratively determining a set of other values of said parameters of said borehole using a least squares minimization technique, said set of fixed values and said sort of other values of said parameters collectively comprising said parameters of said borehole;

final correction means responsive to said set of fixed values and to said set of other values of said parameters and to said voltage signal data for determining final model voltages as a function of both said set of fixed values and said set of other values of said parameters for each said voltage signal data, said final correction means correcting said voltage signal data using said final model voltages thereby developing said set of borehole corrected data; and recording means for recording said set of borehole corrected data developed by said final correction means on said output record medium.

6. The well logging system of claim 5, wherein said fixed values of said parameters of said borehole include a conductivity of mud and a stand-off distance as denoted by the expression $(s_m, X)$, where "$s_m$" is the conductivity of mud disposed within said borehole and "x" is the stand-off distance when said tool is eccentrically disposed in said borehole.

7. The well logging system of claim 6, wherein said other values of said parameters of said borehole include a conductivity of an earth formation and a radius of said borehole as denoted by the expression $(s_f, r)$, where "$s_f$" is the conductivity of said earth formation traversed by said borehole and "r" is the radius of said borehole.

8. The well logging system of claim 7, wherein said parameter determination means comprises:

solver means responsive to said set of fixed values $(s_m, x)$ of said parameters and to said at least some of said voltage signal data for selecting an initial set of said other values $(s_f, r)^1$ of said parameters; and intermediate correction means responsive to said fixed values $(s_m, x)$ and to the initial set of said other values $(s_f, r)^1$ of said parameters for computing intermediate model voltage values for each of said at least some of said voltage signal data as a function of both said fixed values and the initial set of said other values, $(s_m, x)$ and $(s_f, r)^1$, respectively, of said parameters of said borehole, the solver means determining, using a least squares minimization technique, a residual value E as a function of said at least some of said voltage signal data and the intermediate model voltage values and storing said residual value E.

9. The well logging system of claim 8, wherein:

the solver means selects, at each iteration of a plurality of iterations, a further set of said other values $(s_f, r)^n$ of said parameters of said borehole, where $n = 2, 3, 4, \ldots i$, and where i is the total number of said plurality of iterations;

the intermediate correction means computes, at said each iteration of the plurality of iterations, further intermediate model voltage values corresponding, respectively, to said at least some of said voltage signal data, the further intermediate model voltage values being a function of said fixed values $(s_m, x)$ and the corresponding further set of said other values $(s_f, r)^n$ and said parameters selected by the solver means at each corresponding iteration, the solver means determines, by least square minimization at said each iteration of the plurality of iterations, another value of said residual value E as a function of said at least some of said voltage signal data and the further intermediate model voltage values computed by the intermediate correction means at each corresponding iteration and stores said other values of said residual value E, the solver means selects, after a final iteration of the plurality of iterations, a special set of said other values $(s_f, r)^*$ of said parameters of said borehole, the special set of said other values $(s_f, r)^*$ of said parameters being one of said other values $(s_f, r)^1$ and $(s_f, r)^n$, where $n = 2, 3, \ldots, i$, which correspond to a minimum one of the residual values E stored in said solver means, the special set of said other values $(s_f, r)^*$ of said parameters representing said step of other values of said parameters of said borehole determined by said parameter determination means.

10. The well logging system of claim 9, wherein said final correction means comprises:

correction means responsive to said set of fixed values $(s_m, x)$ and to said set of other values $(s_f, r)$ of said parameters of said borehole selected by the solver means for determining said final model voltages as a function of both said set of fixed values $(s_m, x)$ and said set of other values $(s_f, r)$ of said parameters associated with each said voltage signal data; and final correction means responsive to the final model voltages determined by said correction means and to said voltage signal data developed by said well tool for subtracting said final model voltages from corresponding ones of said voltage signal data thereby generating said set of borehole corrected data, said recording means recording said set of borehole corrected data on said output record medium, 11. A method of determining borehole corrected data and recording said borehole corrected data on an output record medium, said borehole corrected data being determined from voltage signal data developed by a well tool when said well tool is disposed in a borehole and representing other voltage signal data that would have been developed by said well tool in the absence of said borehole, said well tool further developing fixed values of parameters of said borehole, comprising the steps of:

(a) iteratively determining other values of said parameters of said borehole using a least squares minimization technique from said fixed values of said parameters and at least some of said voltage signal data developed by said well tool, said fixed values and said other values of said parameters collectively comprising said parameters of said borehole;

(b) determining final model voltages as a function of said fixed values and said other values of said parameters determined during the determining step (a) in response to said voltage signal data from said well tool and said fixed values and said other values of said parameters determined during the determining step (a);

(c) correcting said voltage signal data using said final model voltages thereby developing said borehole corrected data; and (d) recording said borehole corrected data on said output record medium.

12. The method of claim 11, wherein the determining step (a) comprises the steps of:

(e) selecting an initial set of said other values of said parameters in response to said fixed values and said at least some of said voltage signal data;

(f) computing intermediate model voltage values for each of said at least some of said voltage signal data as a function of said fixed values and the initial set of said other values of said parameters of said borehole; and (g) determining, using a least squares minimization technique, a residual value E as a function of said at least some of said voltage signal data and said intermediate model voltage values and storing said residual value E.

13. The method of claim 12, wherein the determining step (a) further comprises the steps of:

(h) selecting, at each iteration of a plurality of iterations, a further set of said other values of said parameters of said borehole;

(i) computing, at said each iteration, further intermediate model voltage values corresponding, respectively, to said at least some of said voltage signal data, each of the further intermediate model voltage values being a function of said fixed values and the corresponding further set of said other values of said parameters selected, at said each iteration, during the selecting step (h);

(j) determining, by least squares minimization at said each iteration, another value of said residual value E as a function of said at least some of said voltage signal data and the corresponding further intermediate model voltage values computed during the computing step (i) at each corresponding iteration and storing said another value of said residual value E; and (k) selecting, after a final iteration of the plurality of iterations, a special set of said other values of said parameters of said borehole, said special set being one of a plurality of said other values of said parameters of said borehole which corresponds to a minimum one of the residual values E stored during step (g) and step (j), the special set of said other values of said parameters representing said other values of said parameters of said borehole determined during the determining step (a).

14. The method of claim 13, wherein the correcting step (c) comprises the steps of:

subtracting said final model voltages from said voltage signal data thereby developing said borehole corrected data.

* * * * *

UNITED STATES PATENT AND TRADEMARK OFFICE
CERTIFICATE OF CORRECTION

PATENT NO.   : 5,041,975
DATED        : August 20, 1991
INVENTOR(S)  : Minerbo et al.

It is certified that error appears in the above-identified patent and that said Letters Patent is hereby corrected as shown below:

Column 113, line 9;

Claim 1, line 1, delete "evaporator", and
               insert --apparatus--.

Signed and Sealed this

Thirteenth Day of October, 1992

Attest:

DOUGLAS B. COMER

*Attesting Officer*    Acting Commissioner of Patents and Trademarks